(12) United States Patent
Palmaro

(10) Patent No.: US 10,001,901 B2
(45) Date of Patent: Jun. 19, 2018

(54) SYSTEM AND METHOD FOR TEXTURING IN VIRTUAL REALITY AND MIXED REALITY ENVIRONMENTS

(71) Applicant: Unity IPR ApS, Copenhagen K (DK)

(72) Inventor: Gregory Lionel Xavier Jean Palmaro, Paris (FR)

(73) Assignee: Unity IPR ApS, Copenhagen (DK)

( * ) Notice: Subject to any disclaimer, the term of this patent is extended or adjusted under 35 U.S.C. 154(b) by 0 days. days.

(21) Appl. No.: 15/623,114

(22) Filed: Jun. 14, 2017

(65) Prior Publication Data
US 2017/0357407 A1 Dec. 14, 2017

Related U.S. Application Data

(60) Provisional application No. 62/350,024, filed on Jun. 14, 2016.

(51) Int. Cl.
| | |
|---|---|
| *G06F 3/0481* | (2013.01) |
| *G06F 3/0482* | (2013.01) |
| *G06F 3/0484* | (2013.01) |
| *G06T 15/04* | (2011.01) |
| *G06T 19/20* | (2011.01) |
| *G06F 3/01* | (2006.01) |

(52) U.S. Cl.
CPC .......... *G06F 3/04815* (2013.01); *G06F 3/011* (2013.01); *G06F 3/017* (2013.01); *G06F 3/0482* (2013.01); *G06F 3/04845* (2013.01); *G06T 15/04* (2013.01); *G06T 19/20* (2013.01); *G06T 2200/24* (2013.01); *G06T 2219/2012* (2013.01)

(58) Field of Classification Search
CPC ...... G06F 3/011; G06F 3/017; G06F 3/04815; G06F 3/0482; G06F 3/04845; G06T 15/04; G06T 19/20; G06T 2200/24; G06T 2219/2012
See application file for complete search history.

(56) References Cited

U.S. PATENT DOCUMENTS

| | | | |
|---|---|---|---|
| 2005/0024360 A1* | 2/2005 | Abe | G06F 3/0325 345/419 |
| 2007/0209585 A1* | 9/2007 | Ebensberger | G09B 11/10 118/682 |
| 2010/0125811 A1* | 5/2010 | Moore | G06F 3/04817 715/846 |

(Continued)

*Primary Examiner* — Aaron Lowenberger
(74) *Attorney, Agent, or Firm* — Schwegman Lundberg & Woessner, P.A.

(57) ABSTRACT

A system includes hardware processors and a texturing module configured to display a texturing tray within a virtual reality environment or a mixed reality environment, the texturing tray including a first plurality of texturing mode objects, detect that a user has grabbed a first texturing mode object of the first plurality of texturing mode objects from the texturing tray with a virtual hand of the user, based on motion of the virtual hand after the grabbing, moving the first texturing mode object into a position adjacent to a surface of a target object, detect that the user has applied a texturing agent toward the first texturing mode object, and apply a texture effect to the surface of the target object based on a virtual interaction between the texturing agent and the first texturing mode object, the texture effect altering the appearance of the surface of the target object.

16 Claims, 21 Drawing Sheets
(16 of 21 Drawing Sheet(s) Filed in Color)

(56) References Cited

U.S. PATENT DOCUMENTS

2011/0193939 A1* 8/2011 Vassigh .................. G06F 3/011
                                                                                       348/46
2016/0210781 A1* 7/2016 Thomas ................ G06T 19/006

* cited by examiner

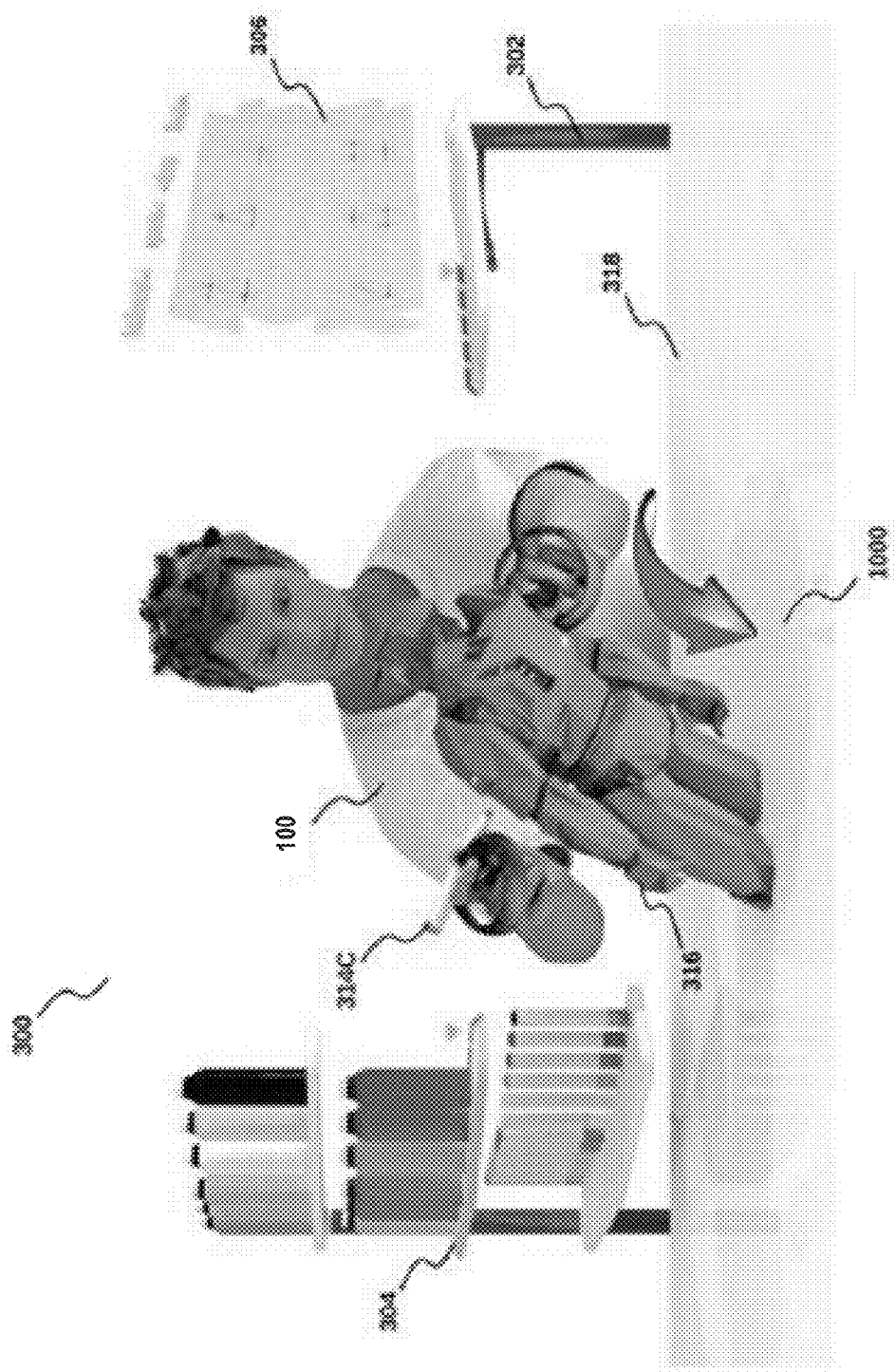

SYSTEM AND METHOD FOR TEXTURING IN VIRTUAL REALITY AND MIXED REALITY ENVIRONMENTS

RELATED APPLICATIONS

This application claims the benefit of priority to U.S. Provisional Patent Application Ser. No. 62/350,024, filed Jun. 14, 2016, herein incorporated by reference in its entirety.

TECHNICAL FIELD

The present disclosure relates to the field of virtual reality (VR) and mixed reality (MR) and, more specifically, to systems and methods for creating and applying textures to virtual objects within VR and MR environments.

BACKGROUND

Various tools exist for creating and manipulating three-dimensional (3D) virtual objects for presentation in two-dimensional (2D) environments. The tools often include user interfaces accessible via 2D computer screens. Users interact with the user interfaces using touch screens, mice, and keyboards. Many of these user interfaces are within software programs that allow the user to create, manipulate, and alter 3D objects such as characters and virtual objects. However, in 3D VR environments, different devices and mechanics of interaction may be used. For example, developers may not use mice or keyboards. VR development environments and accompanying input and output devices (e.g., handheld controllers, VR headsets) allow a user to interact with full 3D objects in the VR environment using more natural movements (e.g., using their hands).

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various ones of the appended drawings merely illustrate example embodiments of the present disclosure and cannot be considered as limiting its scope.

FIGS. 10A-10B illustrate a system for resetting the orientation of the virtual object with the texturing station.

The headings provided herein are merely for convenience and do not necessarily affect the scope or meaning of the terms used. Like numbers in the Figures indicate like components.

In the description below, the term "module" refers broadly to software, hardware, or firmware (or any combination thereof) components. Modules are typically functional components that can generate useful data or other output using specified input(s). A module may or may not be self-contained. An application program (also called an "application") may include one or more modules, or a module can include one or more application programs.

DETAILED DESCRIPTION

The description that follows describes systems, methods, techniques, instruction sequences, and computing machine program products that constitute illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details.

There is described herein a texturing system and related methods that allows a user (e.g., a game developer) to texture virtual objects in a natural way (e.g., applying a texture to an object). During development, the user may interact with a VR environment editor that allows the user to create and edit a virtual environment that may later be used, for example, as part of a computer game. The virtual environment for a computer game typically includes virtual objects (e.g., surfaces or 3D volumes) that the developer creates to simulate a particular setting that may later be rendered to a player during game play. For each virtual object within the virtual environment, the developer may identify a texture to be rendered for that virtual object.

The texturing system described herein provides a texturing station to the user within the VR environment. In one example embodiment, the texturing station includes a painting tray and a texturing tray. The user views and interacts with the texturing station within the VR environment via a VR head mounted display (HMD) and one or more hand controllers (e.g., handheld tracking devices, optical tracking devices). The texturing system allows the user to create, interact with, and manipulate textures and other aspects of virtual objects within the VR environment, as described herein.

Figure 1:
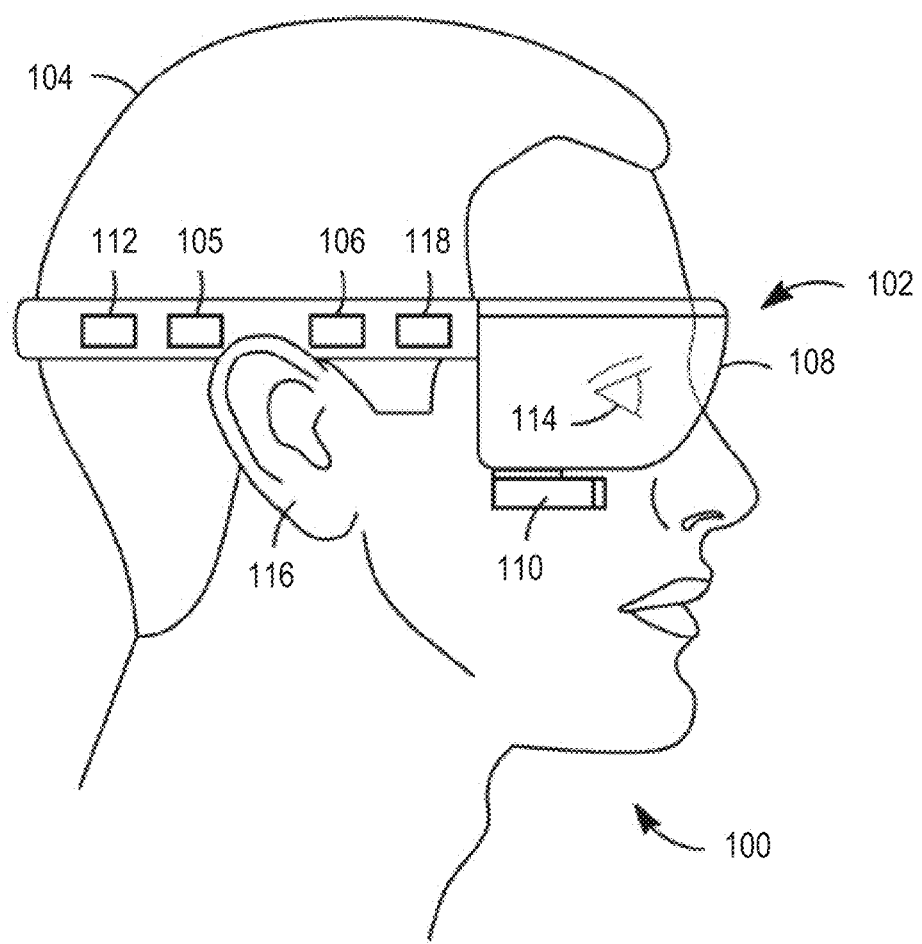
FIG. 1 is a diagram of an example head-mounted display (HMD) worn by a user.

FIG. 1 is a diagram of an example head-mounted display (HMD) 102, worn by a user (or "wearer") 100. In the example embodiment, the user 100 (e.g., a game developer or game player) experiences a VR environment or augmented reality (AR) content (e.g., in an MR environment) while wearing the HMD 102. In the example embodiment, the HMD 102 may include an opaque visor 108 which may obscure the wearer 100's view of the real world, and which may display a complete virtual environment to the wearer 100. In other embodiments, the HMD 102 includes a transparent or semi-transparent visor (or "lens", or "lenses") 108 through which the wearer 100 views their surroundings (also herein referred to also as "the real world"). It should be understood that the visor 108 is illustrated in FIG. 1 as transparent for purposes of illustration but, as described above, the visor 108 may be opaque in some embodiments.

In the example embodiment, the HMD 102 also includes a display device 118 that renders graphics (e.g., virtual objects) onto the visor 108. As such, the visor 108 acts as a "screen" or surface on which the output of the display device 118 appears, and through which the wearer 100 experiences virtual content. In some embodiments, the HMD 102 may present two different projections via the visor 108 (e.g., one for each eye). The display device 118 is driven or controlled by one or more graphics processing units (GPUs) 106 or holographic projection units (HPUs). The GPU 106 processes aspects of graphical output that assists in speeding up rendering of output through the display device 118.

In the example embodiment, the HMD 102 also includes one or more central processing units (CPUs) 105 that may execute some of the operations and methods described herein. The HMD 102 also includes an audio device 112 (e.g., speakers, not separately depicted) that is configured to present audio output to the wearer 100 (e.g., via ears 116 of the user 100). While not separately shown, the HMD 102 also includes wired or wireless network adapters (e.g., Wi-Fi®, Bluetooth, cellular) that facilitate communication between the HMD 102 and other computing devices described herein.

In some embodiments, the HMD 102 includes a digital camera 110. The digital camera device (or just "camera") 110 is a forward-facing video input device that is oriented so as to capture at least a portion of a field of view (FOV) of the wearer 100. In other words, the camera 110 captures or "sees" an angle of view of the real world based on the orientation of the HMD 102 (e.g., similar to what the wearer 100 sees in the wearer 100's FOV when looking through the visor 108). The cameras 110 may be configured to capture real-world digital video around the user 100 (e.g., a field of view, a peripheral view, or a 360° view around the wearer 100). The cameras 110 may be used to capture digital video of the real world environment around the user 100. In some embodiments, output from the digital camera 110 may be projected onto the visor 108 (e.g., in opaque visor embodiments), and may also include additional virtual content (e.g., added to the camera output). In some embodiments, the camera 110 may be a depth camera, or the HMD 102 may otherwise include a depth sensor, capturing depth information for objects within the FOV of the user 100.

In some embodiments, the HMD 102 may include one or more sensors (not separately shown), or may be coupled in wired or wireless communication with the sensors (e.g., via near-field communication (NFC) with a wrist-wearable device also worn by the wearer 100). For example, the HMD 102 may include motion or position sensors configured to determine a position or orientation of the HMD 102 or position of nearby real-world objects. In some embodiments, the HMD 102 may include a microphone for capturing audio input (e.g., spoken vocals of the user 100).

In some embodiments, the HMD 102 may be similar to VR HMDs such as the Oculus Rift™, The HTC Vive™, The Playstation VR™, and the like. In some embodiments, the user 100 may hold one or more hand tracking devices ("handhelds") (not separately shown in FIG. 1) (e.g., one in each hand). The handhelds provide information about the absolute or relative position and orientation of a user's hands and, as such, are capable of capturing hand gesture information. The handhelds may be configured to operate directly with the HMD 102 (e.g., via wired or wireless communication). In some embodiments, the handhelds may be Oculus Touch™ hand controllers, HTC Vive™ hand trackers, or Playstation VR™ hand controllers. The handhelds may also include one or more buttons or joysticks built into the handheld. In other embodiments, the user 100 may wear one or more wearable hand tracking devices (e.g., motion tracking gloves, not shown), such as those made commercially available by Manus VR (Netherlands). In still other embodiments, hand motion of the user 100 may be tracked without, or in addition to, the handhelds or wearable hand tracking devices via a hand position sensor (not shown, e.g., using optical methods to track the position and orientation of the user's hands) such as, for example, those made commercially available by Leap Motion, Inc. (a California corporation). Such hand tracking devices (e.g., handhelds) track the position of one or more of the hands of the user 100 during operation.

During operation, in the example embodiment, the HMD 102 is mounted on a head 104 of the wearer 100, and over both eyes 114 of the wearer 100, as shown in FIG. 1. The wearer 100 may be presented with a virtual environment which may be experienced via the HMD 102 and handhelds as described herein. Further, a texturing system (not separately shown in FIG. 1) is used in conjunction with the HMD 102 to allow the wearer 100 to edit textures of virtual objects within a virtual environment, as described herein.

Figure 2:
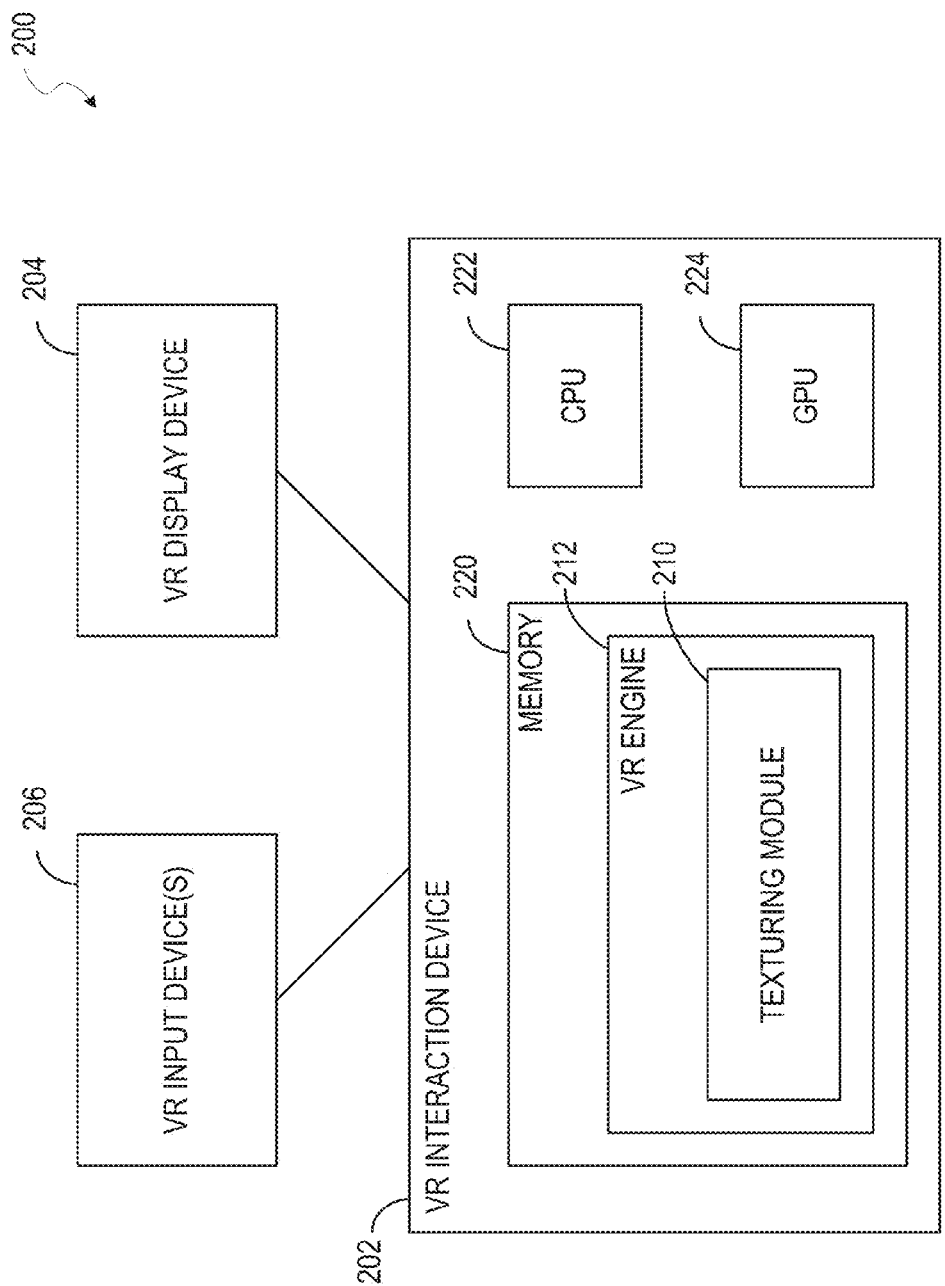
FIG. 2 is a component diagram of a VR texturing system that includes components similar to the HMD and the handhelds shown in FIG. 1.

FIG. 2 is a component diagram of a texturing system 200 that includes components similar to the HMD 102 and the handhelds discussed in relation to FIG. 1. In the example embodiment, the texturing system 200 includes a VR interaction device 202, a VR display device 204, and one or more VR input devices 206. In some embodiments, the VR display device 204 may be similar to the visor 108, and the VR input device(s) 206 may be similar to the handhelds or other tracking devices described above in reference to FIG. 1.

In the example embodiment, the VR interaction device 202 includes a memory 220, one or more CPUs 222, and one or more GPUs 224 or HPUs. In some embodiments, the CPU 222 may be similar to the CPU 105, the GPU 224 may be similar to the GPU 106, and the VR interaction device 202 may be a part of the HMD 102. In some embodiments, the texturing system 200 and the various associated hardware and software components described herein may provide AR content instead of, or in addition to, VR content (e.g., in an MR environment). It should be understood that the systems and methods described herein may be performed with AR content and, as such, the scope of this disclosure covers both MR and VR applications.

In the example embodiment, the VR interaction device 202 includes a VR engine 212, executed by the CPU 222 and/or GPU 224, that provides a VR environment through the VR display device 204 (e.g., to the user 100). The VR engine 212 includes a texturing module 210 that enables various aspects of texture creation and manipulation as described herein. The texturing module 210 may be implemented within, or communicate with, a larger more generic VR software application such as the VR engine 212 (e.g., a VR editing or gaming application).

The texturing module 210 and the VR engine 212 include computer-executable instructions residing in the memory 220 that are executed by the CPU 222 and optionally by the GPU 224 during operation. The VR engine 212 communicates with the VR display device 204 (e.g., the HMD 102) and also with other VR hardware such as the VR input device(s) 206 (e.g., motion capture devices such as the handhelds). The texturing module 210 may be integrated directly within the VR engine 212, or may be implemented as an external piece of software (e.g., a plugin).

During operation, in an example embodiment, the texturing module 210 provides a texturing station (not separately shown in FIG. 2) to the user 100 within the virtual environment (e.g., as rendered by the VR engine 212). The user 100 may be a developer creating or editing virtual objects within the virtual environment. Further, the user 100 interacts with the texturing station in order to perform various texture creation and editing features associated with the virtual objects. The texturing station and various texture functionality provided by the texturing module 210 are described in greater detail below with respect to FIGS. 3-10.

Figure 3:
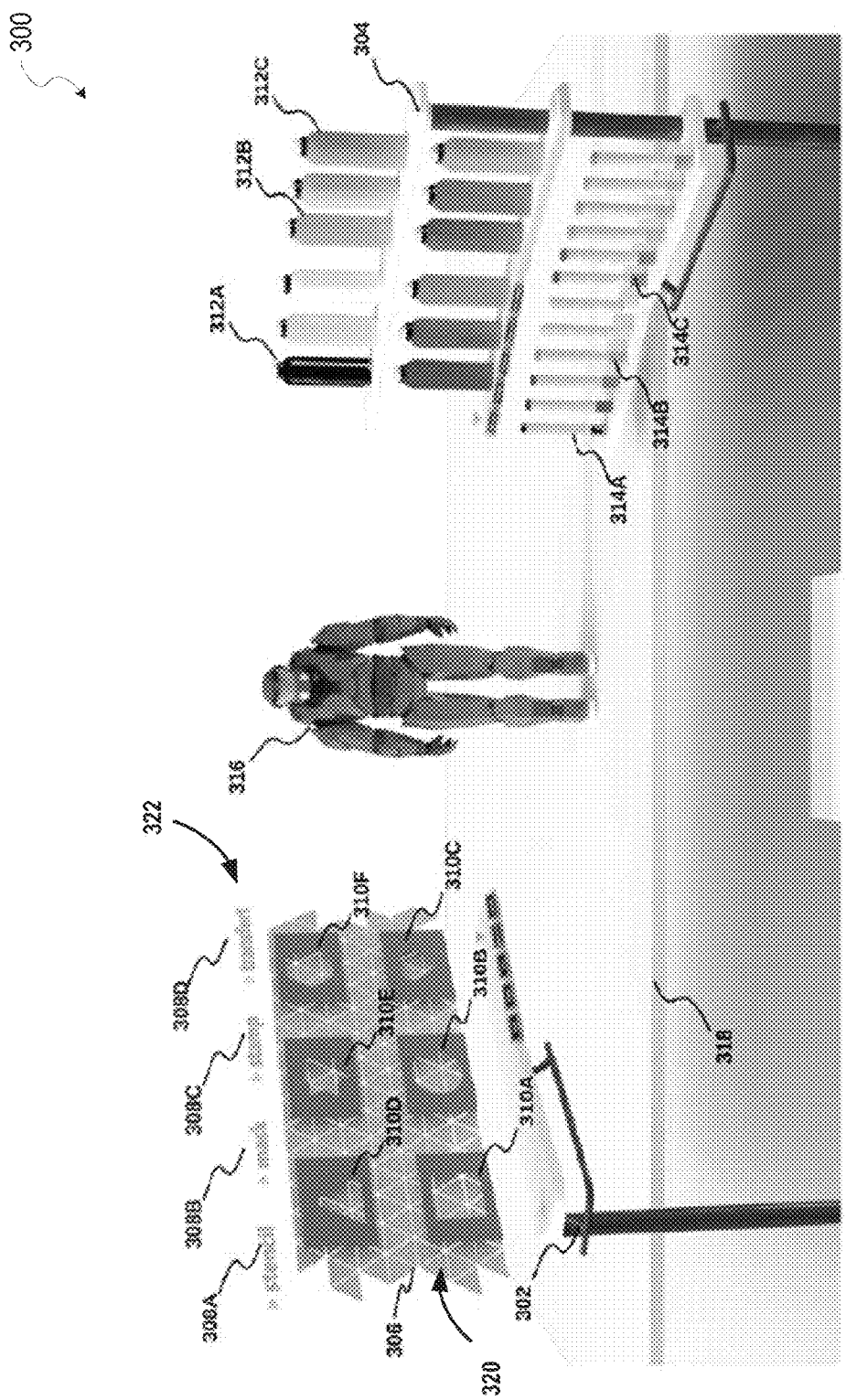
FIG. 3 is an example view of a VR environment provided by the VR engine (e.g., including the texturing module).

FIG. 3 is an example view of a virtual environment 300 provided by the VR engine 212 (e.g., including the texturing module 210). In the example embodiment, the virtual environment 300 includes a target object 316 (e.g., an armored avatar) appearing upon a table surface 318 that is operated upon by the user 100 in this example (e.g., during game development). Further, the texturing module 210 provides a texturing tray 302 and a painting tray 304 (collectively referred to as a texturing station). The user 100 may interact with components of the trays 302, 304 within the virtual environment 300 in order to perform various texturing functionality described herein.

In the example embodiment, the texturing tray 302 includes a display wall 306 upon which appears multiple texturing mode objects 320. The texturing mode objects 320 appearing on the display wall 306 change based on a selected mode. In the example shown in FIG. 3, the texturing mode objects 320 include six stencils 310A, 310B, 310C, 310D, 310E, 310F (collectively, stencils 310), but it should be understood that any number of texturing mode objects 320 may appear. The texturing mode objects 320 appear as if they are attached (e.g., acting as if magnetically attached) to the display wall 306. In some embodiments, the display wall 306 includes a recurring geometric pattern such that the orientation of the display wall 306 is more easily perceived by the user 100 (e.g., in relation to the background environment in VR or AR), and such that the texturing mode objects 320 appearing on the display wall 306 are more easily distinguishable from the display wall 306.

In the example embodiment, the texturing tray 302 also includes a texturing tray menu 322 that includes multiple texture mode selectors 308A, 308B, 308C, and 308D (collectively, texture mode selectors 308). The texture mode selectors 308 each correspond to a mode associated with the texturing tray 302 which, in the example embodiment, includes "stencil," "mask," "stamp," and "transferor" (e.g., texture applicator) modes. During operation, the user 100 changes the mode of the texturing tray 302 by selecting one of the texture mode selectors 308. In response, the texturing module 210 changes which texturing mode objects 320 appear for use by the user 100 on the display wall 306. Various example modes and their associated texturing mode objects 320 are described in greater detail below with respect to FIGS. 4A-4D.

In the example embodiment, the painting tray 304 includes virtual painting tools (also referred to herein as "texturing agents") such as spray cans 312A, 312B, 312C, markers 314A, 314B, 314C, and brushes (not shown). Such virtual painting tools may simulate their real-world equivalents and, when used, may impart texture effects (e.g., color) to an object such as the target object 316.

During operation, the user 100 may summon one or more of the trays 302, 304 into the virtual environment 300 using one or more gestures (a "summon gesture," e.g., performed using the handheld controller(s)). In some embodiments, the gesture may include pushing a virtual button, or selecting a virtual card for texturing (e.g., from a card tray). When the trays 302, 304 are initially provided by the texturing module 210, they are positioned in the virtual environment 300 automatically, based on the position of the user 100 and/or input from the user 100 (e.g., on left and right peripheral sides, based on the orientation or field of focus of the user 100, and within reach of the user 100).

Further, in some embodiments, the painting tray 304 may be placed on the side of the user 100 which is determined to be the dominant hand of the user 100 (e.g., right-handed, or left-handed). For example, if the user 100 is right-handed, the painting tray 304 may be placed on the right-hand side of the user 100 and the texturing tray 302 may be placed on the left-hand side of the user 100, or vice versa. The dominant hand of the user 100 may be determined prior to the first placement of the trays 302, 304 by, for example, analyzing the summon gesture. During gesture detection events, the texturing module 210 analyzes the hand movements of the user 100 and assigns a value to each hand based on the number of times a hand performs an action, or the type of action that it performs. The dominant hand may be determined to be the hand that performs more actions, or the hand that performs a specific action commonly done with a dominant hand (e.g., selecting objects, moving objects, interacting with a menu). For example, if the summon gesture includes pushing a button, the dominant hand may be determined to be the hand that the user 100 used to push the button.

In the example embodiment, the trays 302, 304 are virtual objects within the virtual environment 300, and either tray 302, 304 may be moved or positioned within the virtual environment 300 using object movement gestures similar to those used to move other virtual objects (e.g., the target object 316) within the virtual environment 300 (e.g., grab, move, drop with a virtual hand, move the tray with a point-and-select ray from a handheld device, or gaze control). In some embodiments, the trays 302, 304 include handles and wheels to facilitate movement within the virtual environment 300 (e.g., presenting areas configured to allow movement interactions).

In some embodiments, if the user 100 is sufficiently far from one of the trays 302, 304 (e.g., based on a predetermined threshold distance), the user 100 may bring the tray 302, 304 closer to their body using a "retrieve" gesture. In the example embodiment, the retrieve gesture includes pointing the palm of an open hand towards the tray (e.g., as detected by the handheld controller, or hand tracking device). After the user 100 performs the retrieve gesture for a brief period of time (e.g., 1 or 2 seconds), the tray 302, 304 may begin to shake, levitate, and slowly accelerate towards the user 100 until it stops near the user 100 and settles back to the ground (e.g., in the virtual environment 300).

In the example embodiment, the virtual environment 300 is illustrated and described as a complete VR environment (e.g., the user 100 is operating in VR). It should be understood, however, that the texturing systems and methods described herein may also be provided in an AR environment. For example, the table surface 318 may be a real-world table in front of the user 100 (e.g., a desktop table in a working environment), and the target object 316 and the trays 302, 304 may be AR content presented by the texturing module 210 or the VR engine 212. Further, and for example, the user 100 may interact with the target object 316 and trays 302, 304 as in VR, and the positioning of the target object 316 and trays 302, 304 may be constrained by the position of physical objects within the real-world environment or other virtual objects. As such, the user 100 may perform texture creation and editing on the target object 316 with the trays 302, 304 while maintaining a view of their real-world surroundings. In some embodiments, the user 100 may perform texturing of real-world objects. For example, the texturing module 310 may identify a surface of a real-world object such as the table surface 318, and may apply a texture to that surface similar to a virtual object. Since the real-world object is not virtually movable, the user 100 may move near the object to apply the texture.

FIGS. 4A-4D illustrate various example embodiments for the texturing tray 302. In the example embodiments, the texturing tray 302 includes a lower shelf 402 and an upper shelf 404 connected by a shaft 400. The lower shelf 402 includes two front wheels 403A, 403B and two rear wheels (not shown) upon which the texturing tray 302 may roll (e.g., virtually simulated). The display wall 306 floats just above the upper shelf 404, or may be attached to it. During operation, the texturing tray 302 displays different sets of texturing mode objects 320, depending upon the selected mode.

Figure 4A:
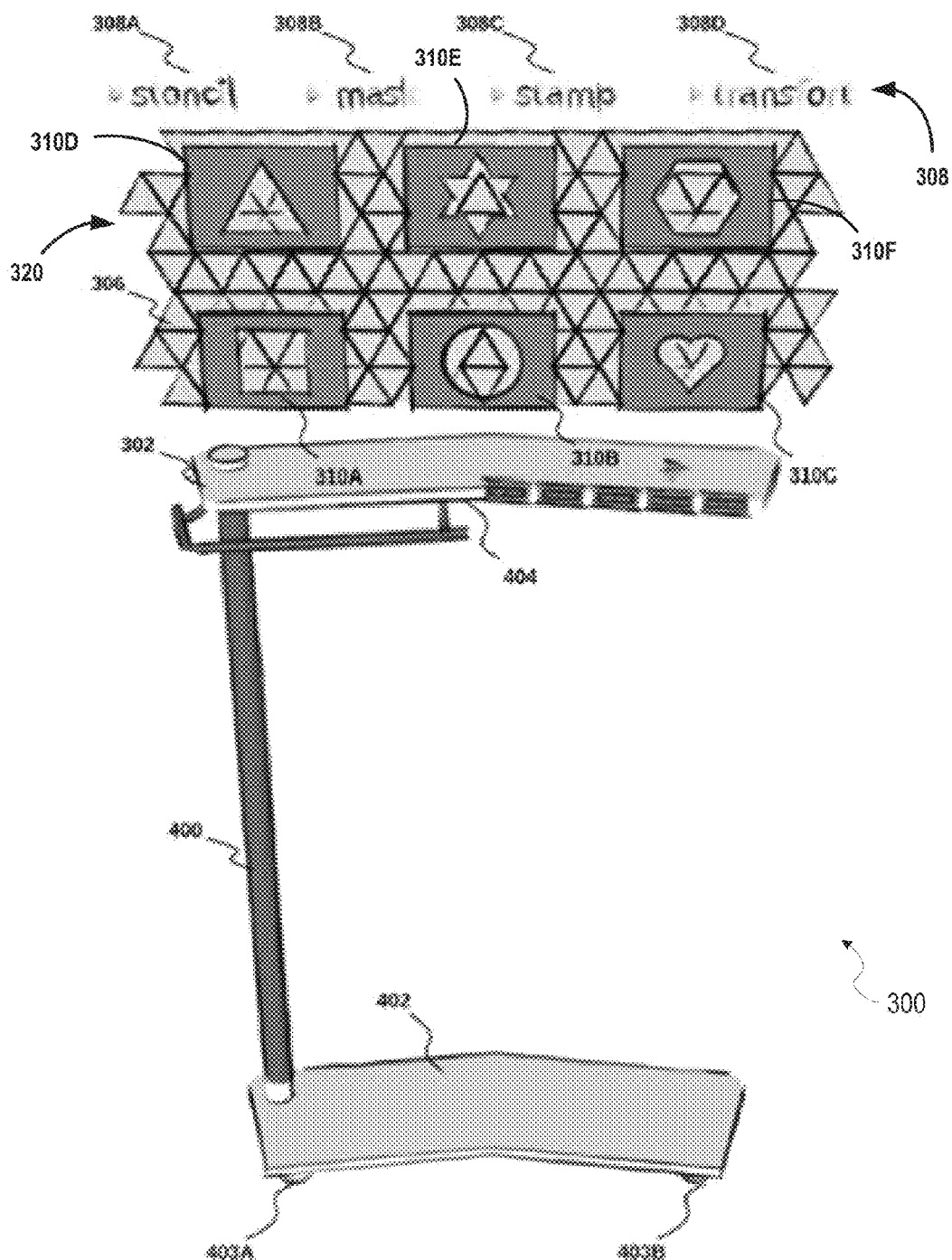
FIG. 4A illustrates the texturing tray in a stencil mode, for example, after the user selects the stencil selector.

FIG. 4A illustrates the texturing tray 302 in a stencil mode, for example, after the user 100 selects the stencil selector 308A. In the example embodiment, when in the stencil mode, the texturing module 210 presents multiple texturing mode objects 320. More specifically, the example texturing mode objects 320 in stencil mode include a square stencil 310A, a circle stencil 310B, a heart stencil 310C, a triangle stencil 310D, a star stencil 310E, and a hexagon stencil 310F (collectively, stencils 310). It should be understood that the stencils 310 shown in FIGS. 3 and 4A are examples, and any shape or number of stencils are within the scope of this disclosure.

In the example embodiment, each stencil 310 includes a virtual flat surface with a patterned section removed from the surface. The stencil 310 acts as a blocker, similar to certain types of real-world stencils, allowing paint or color from a color marker or other coloring agent to pass through the patterned section in the stencil 310 and to be applied to a virtual object (e.g., simulating filling in the shape of the stencil 310). For example, the user 100 may select a stencil 310 from the display wall 306, position the stencil 310 over a surface of a virtual object, and apply (e.g., spray) paint onto the stencil (i.e., onto the object through the stencil).

Figure 4B:
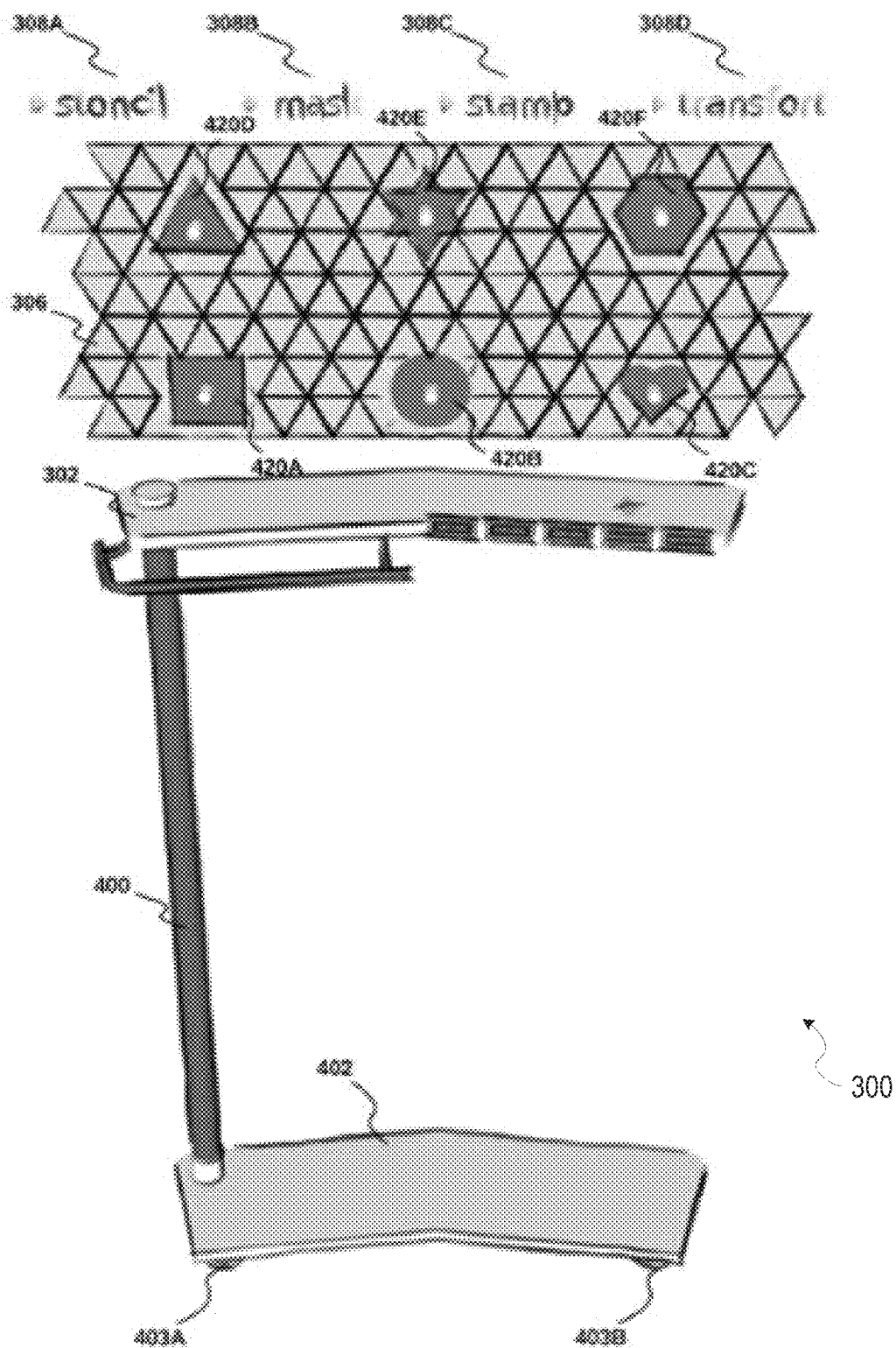
FIG. 4B illustrates the texturing tray in a mask mode, for example, after the user selects the mask selector.

FIG. 4B illustrates the texturing tray 302 in a mask mode, for example, after the user 100 selects the mask selector 308B. In the example embodiment, when in the mask mode, the texturing module 210 presents multiple texturing mode objects 320. More specifically, the example texturing mode objects 320 include a square mask 420A, a circle mask 420B, a heart mask 420C, a triangle mask 420D, a star mask 420E, and a hexagon mask 420F (collectively, masks 420). It should be understood that the masks 420 shown in FIG. 4B are examples, and any shape or number of masks 420 are within the scope of this disclosure.

In the example embodiment, the masks 420 perform an inverse operation of that of the stencils 310. More specifically, each mask 420 includes a virtual flat surface having a patterned shape. The mask 420 acts as a blocker, allowing paint or color from a color marker or other coloring agent to be blocked by the shape of the mask 420 and to be applied to a virtual object (e.g., around the periphery of the shape of the mask 420). For example, the user 100 may select a mask 420 from the display wall 306, position the mask 420 over a surface of a virtual object, and apply (e.g., spray) paint over the mask 420, thereby leaving an unpainted shape on the object.

Figure 4C:
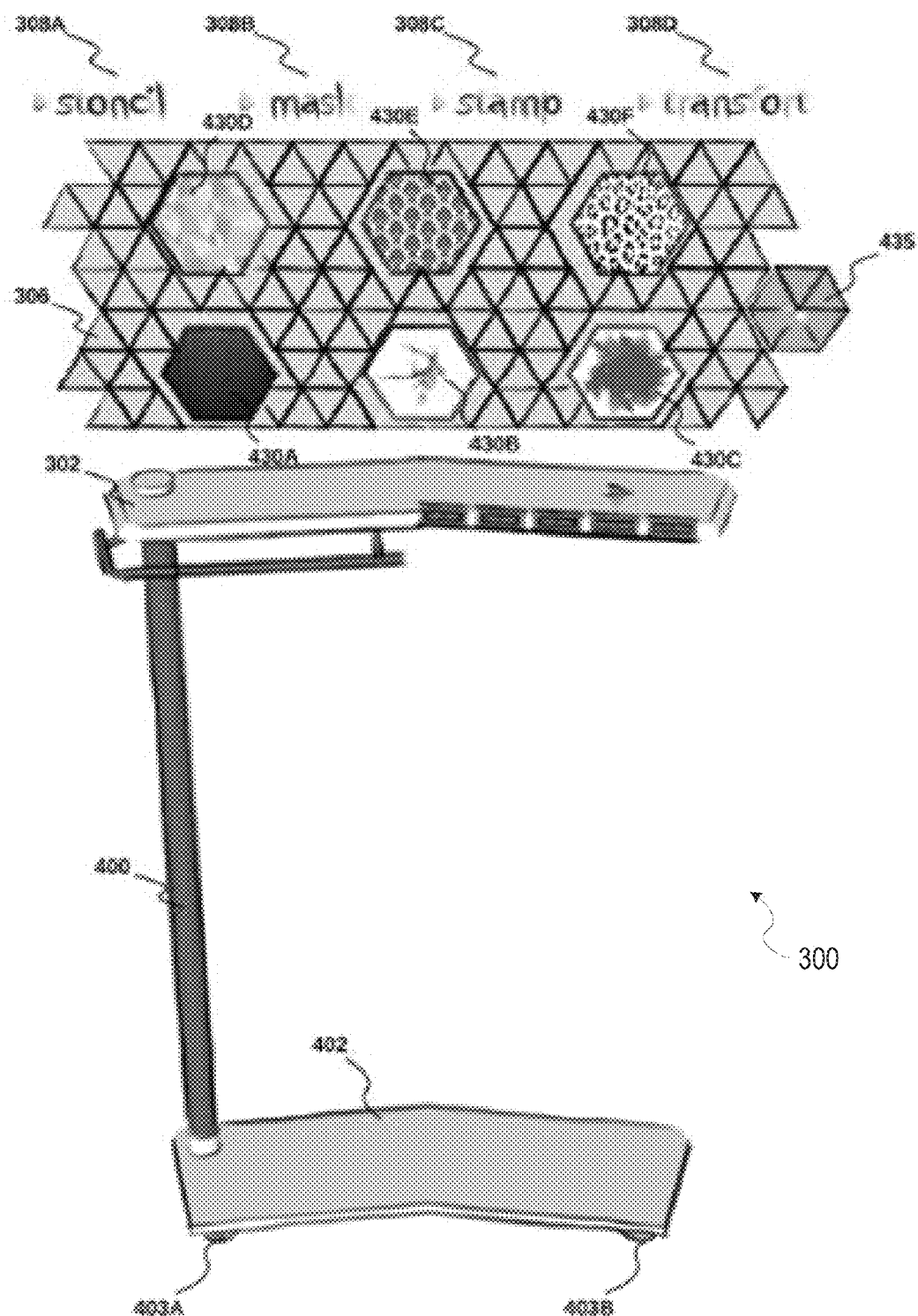
FIG. 4C illustrates the texturing tray in a stamp mode, for example, after the user selects the stamp selector.

FIG. 4C illustrates the texturing tray 302 in a stamp mode, for example, after the user 100 selects the stamp selector 308C. In the example embodiment, when in the stamp mode, the texturing module 210 presents multiple texturing mode objects 320, with each texturing mode object 320 including a stamp pattern 430. It should be understood that the stamp patterns 430 shown in FIG. 4C are examples, and any type or number of stamp patterns are within the scope of this disclosure. In the example embodiment, when applied by the user 100, the stamp patterns 430 apply the pattern to a virtual object. The stamp mode includes a stamp tool 435 that may be used by the user 100 to transfer the stamp pattern 430 to an object. In some embodiments, the stamp pattern 430 may similarly be applied to a real-world object by, for example, attaching the stamp pattern 430 to a surface of the real-world object.

Figure 4D:
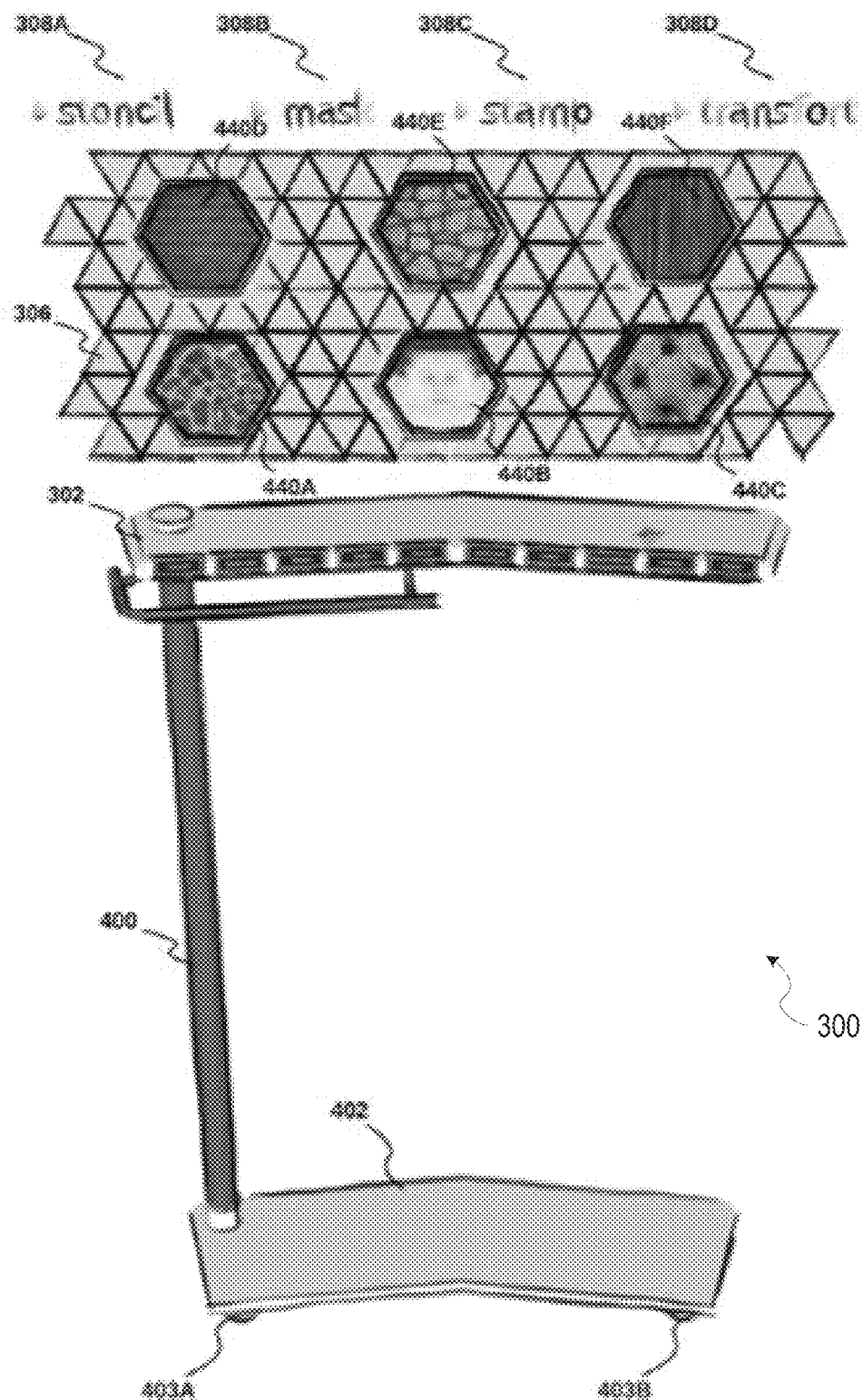
FIG. 4D illustrates the texturing tray in an applicator mode, for example, after the user selects the applicator selector.

FIG. 4D illustrates the texturing tray 302 in an applicator mode, for example, after the user 100 selects the applicator selector 308D. In the example embodiment, when in the applicator mode, the texturing module 210 presents multiple texturing mode objects 320. More specifically, the example texturing mode objects 320 include an animal skin texture applicator 440A, a human face texture applicator 440B, a leather sofa texture applicator 440C, a rectangular brick wall texture applicator 440D, an irregular stone wall texture applicator 440E, and a green bamboo wall texture applicator 440F. The texture applicators 440 are described in greater detail below with respect to FIG. 8.

FIGS. 5-10 illustrate example operational use cases for the texturing tray 302 and the painting tray 304 within the virtual environment 300. Further, FIGS. 5-10 show handheld devices or aspects of the user 100 such as, for example, an avatar within the virtual environment 300, or body parts of the user 100. It should be understood that, in some embodiments (e.g., in VR embodiments), some or all of these objects may or may not be rendered for view by the user 100 (e.g., in VR embodiments), and in some embodiments (e.g., in AR embodiments), some or all of these objects may be real-world objects.

Figure 5:
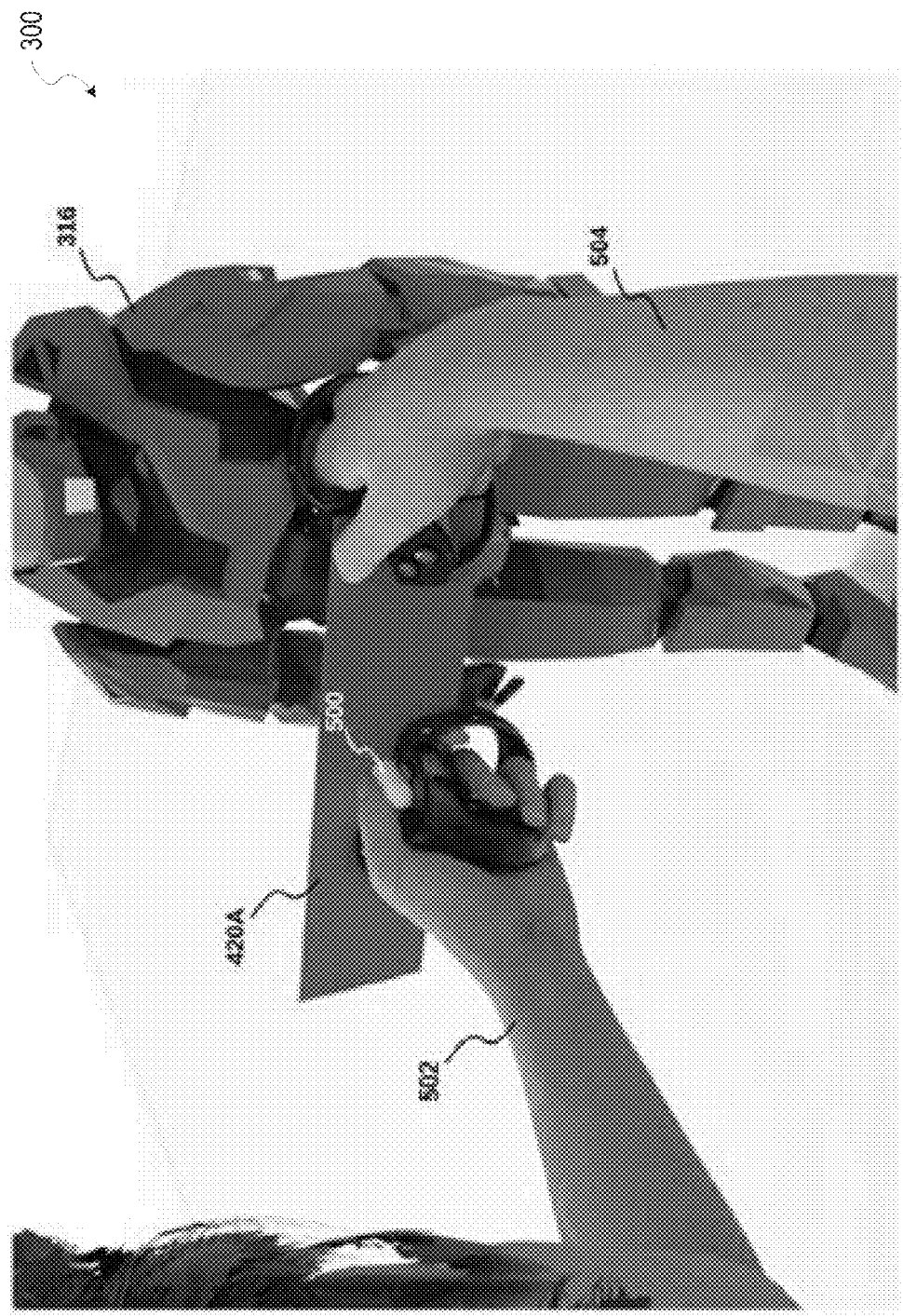
FIG. 5 illustrates the mask being manipulated into position in the VR environment by a right hand and a left hand of the user.

FIG. 5 illustrates the mask 420A being manipulated into position in the virtual environment 300 by a virtual right hand 504 and a virtual left hand 502 of the user 100. In the example embodiment, the user 100 attaches the mask 420A to the target object 316 where desired. In some embodiments, the user 100 may expand the mask 420A vertically or horizontally by pulling on the mask 420A with one of their virtual hands 502, 504. The mask 420A has a knob 500 to facilitate manipulation for the user 100 (e.g., allowing the user 100 to grab, move, and place the mask 420A). Further, any of the stencils 310, masks 420, stamp patterns 430, and applicators 440 may be expanded or retracted by pulling or pushing on the tools (e.g., from their corners or edges).

Figure 6:
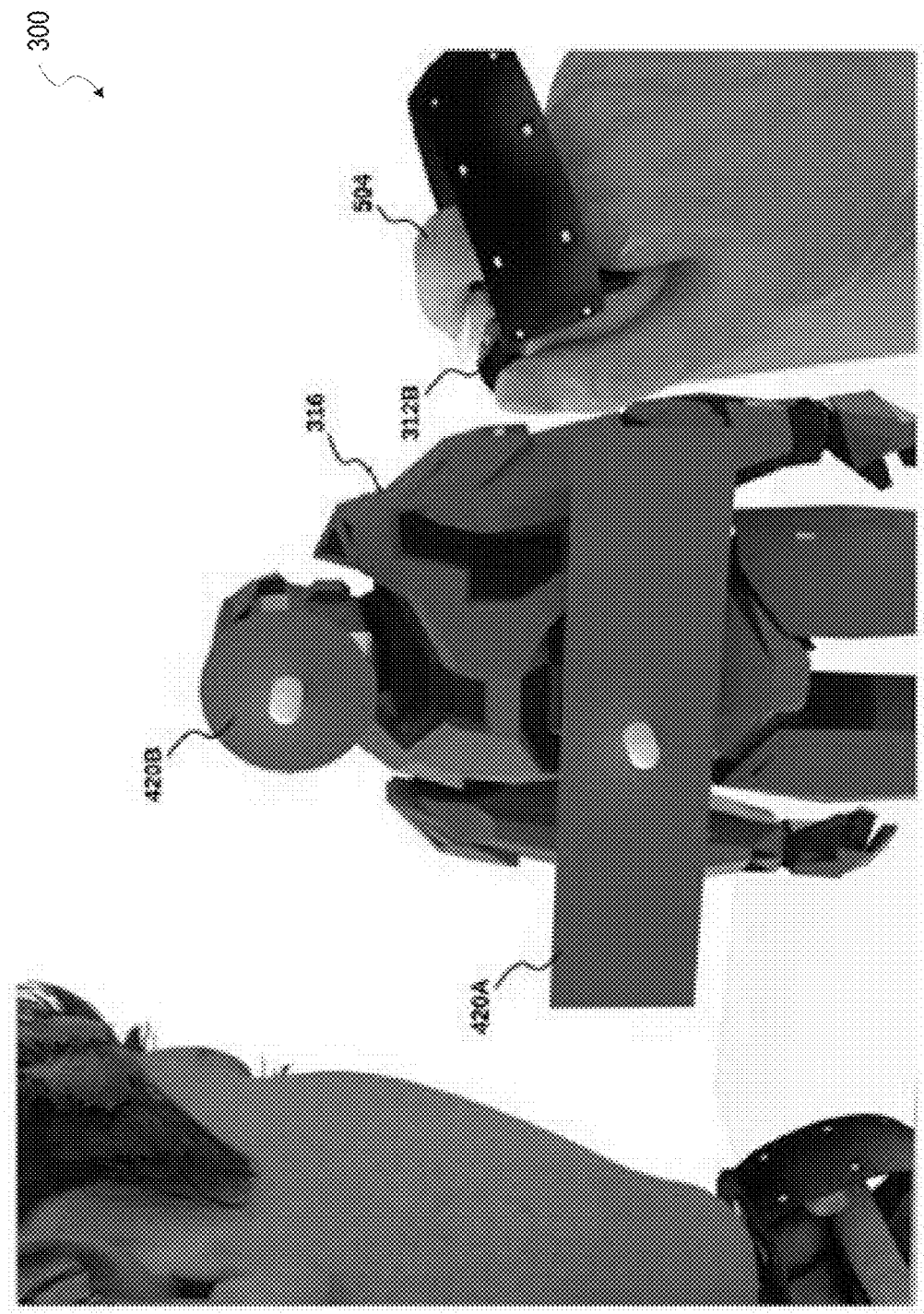
FIG. 6 illustrates two masks positioned within the VR environment relative to the virtual object.

FIG. 6 illustrates two masks 420A, 420B positioned within the virtual environment 300 relative to the target object 316. In the example embodiment, the masks 420 act "magnetic" and may be attached to the target object 316 (e.g., by placing the mask 420 in close proximity to the target object 316) in preparation for further use. For example, as shown in FIG. 6, the user 100 places the circular mask 420B on the head of the target object 316 and the rectangular mask 420A over the torso region of the target object 316. Both masks 420A, 420B are magnetically held to the target object 316 at the position where the user 100 made contact with the target object 316. The magnetic aspect of the masks allows the user to place the masks 420 and have them stay in place (e.g., without the need for the user to hold them) while the user 100 sprays the target object 316 with the spray can 312B or otherwise applies color to the target object 316. In some embodiments, both masks and stencils may be magnetically connected to any virtual object.

Figure 7A:
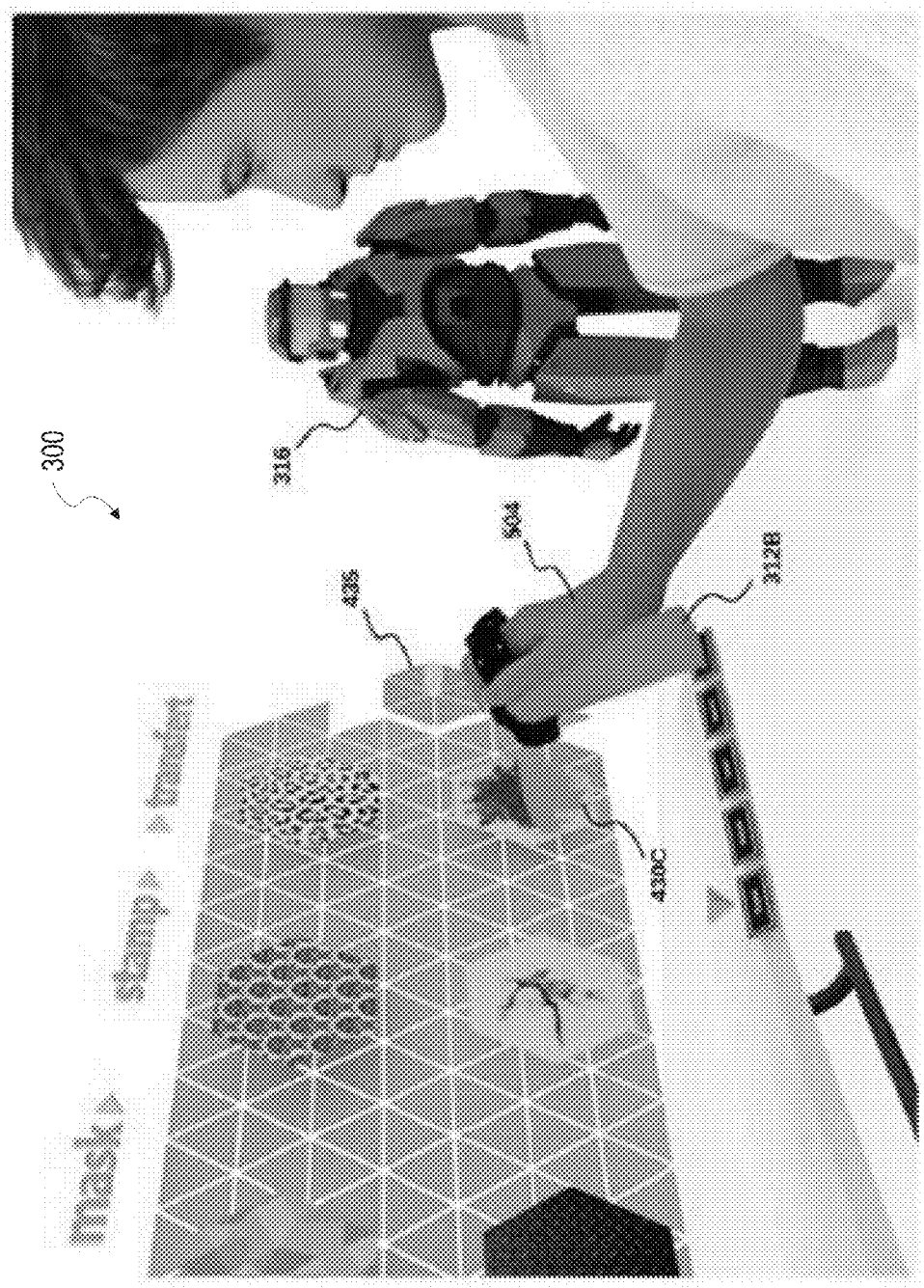
FIGS. 7A-7C illustrate an example stamping process performed by the user in the VR environment.
Figure 7B:
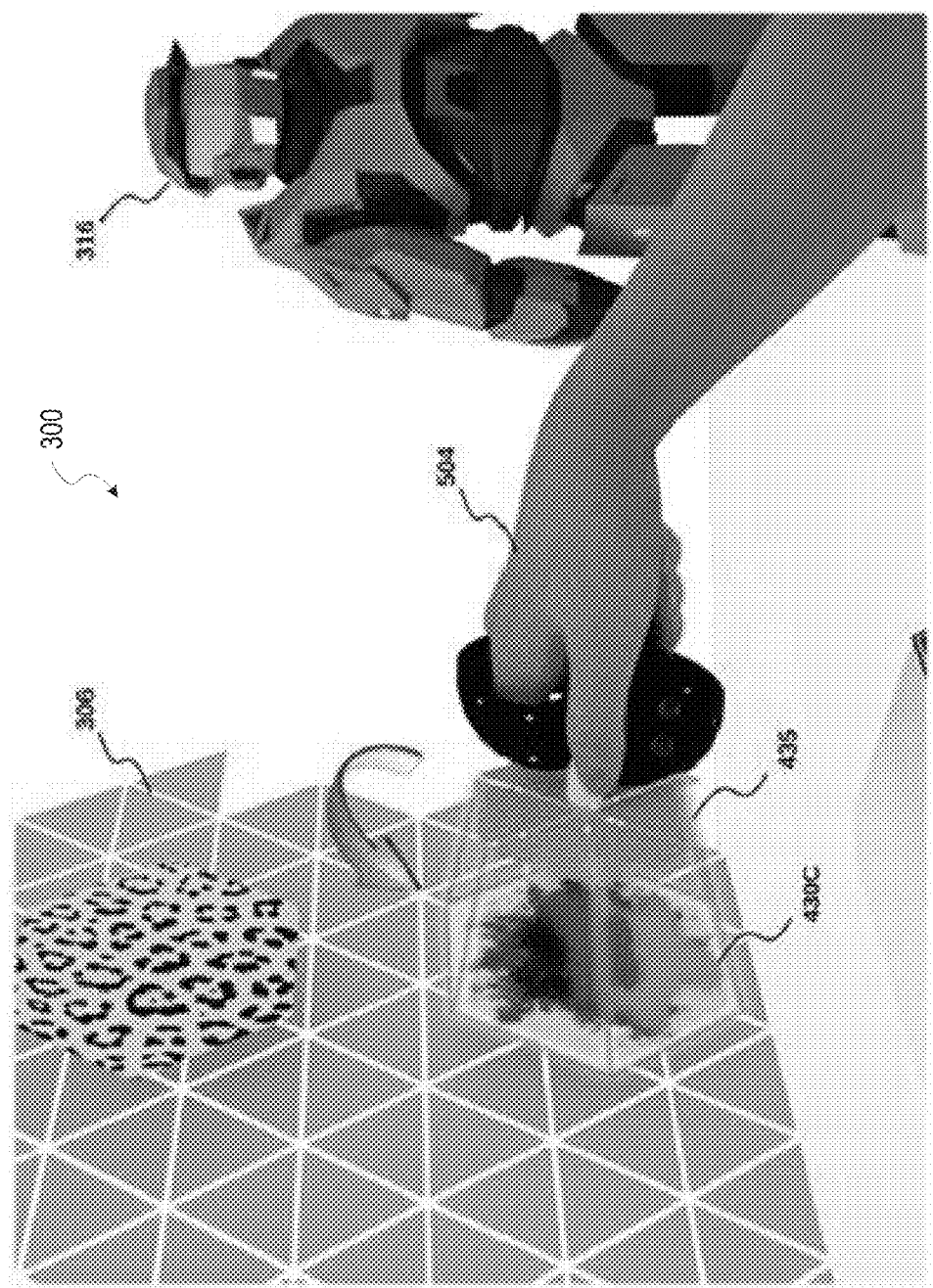
Figure 7C:
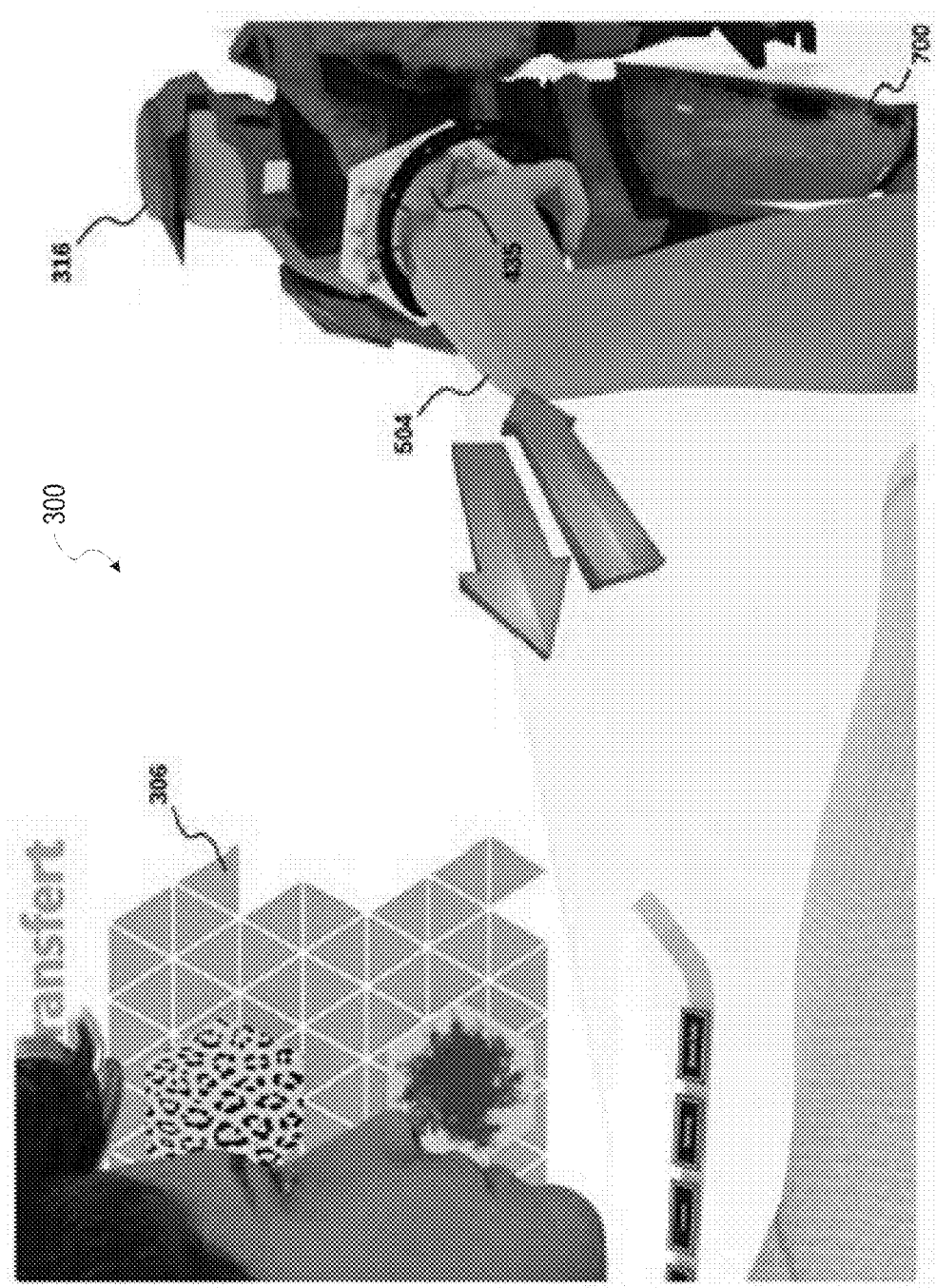

FIGS. 7A-7C illustrate an example stamping process performed by the user 100 in the virtual environment 300. In the example embodiment, each of the six stamp patterns 430 are initially colorless stamps. FIG. 7A illustrates the user 100 adding color using the spray can 312B to the stamp pattern 430C on the display wall 306. In some embodiments, multiple colors may be added to the stamp pattern 430C. In this example, the user 100 colors only the bottom half of the stamp with a green color while the top is black. FIG. 7B illustrates the user 100 taking the stamp tool 435 and pressing it on the colored stamp pattern 430C to transfer the colored stamp pattern 430C onto the tool 435. FIG. 7C illustrates the user 100 applying the stamp tool 435 to the target object 316 with a press-and-retract movement, and also shows the result of applying the stamp tool 435 to the target object 316, whereby the colored stamp pattern 430C is applied to armor 700 of the target object 316.

Figure 8:
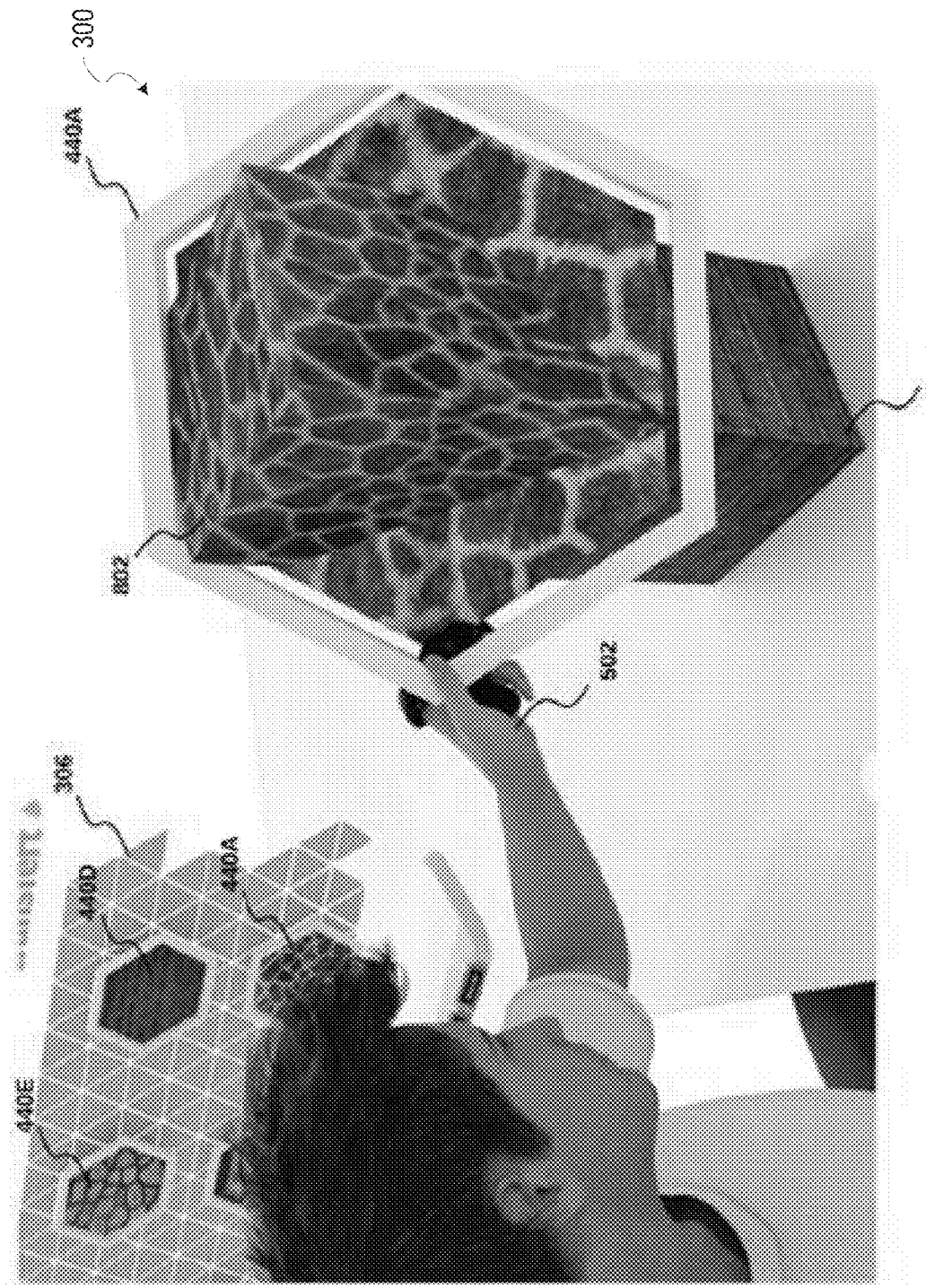
FIG. 8 illustrates the user transferring a texture onto an object using the texture applicator.

FIG. 8 illustrates the user 100 transferring a texture onto an object using the texture applicator 440. In the example embodiment, the user 100 chooses (e.g., grabs) the texture applicator 440 with a specific texture from the display wall 306 (e.g., grabbing the animal skin texture applicator 440A with their virtual levt hand 502). In some embodiments, the user 100 may expand the texture applicator 440A by stretching the texture applicator 440A using a second virtual hand (not shown in FIG. 8) such as to make the texture applicator 44A large enough to fit over a target object 800 (e.g., a rectangular cube initially having a brick texture). The texture applicator 440A also includes a frame 804 and a texture pattern 806 (e.g., the animal skin texture) that covers the area within the frame 804. The frame 804, in the example embodiment, is hexagonal, but the frame may be any shape that enables the systems and methods described herein. The frame 804 may be used to manipulate the texture applicator 440A.

During operation, the texture is applied to the target object 800 when the user 100 passes the texture applicator 440A over the target object 800 such that the texture pattern 806 that touches the target object 800 is transferred to the target object 800, as shown by the newly textured object section 802. In some embodiments, the size of the applicator may be adjusted such that the texture is applied to part of an object (e.g., just a streak), rather than the entire object.

Figure 9A:
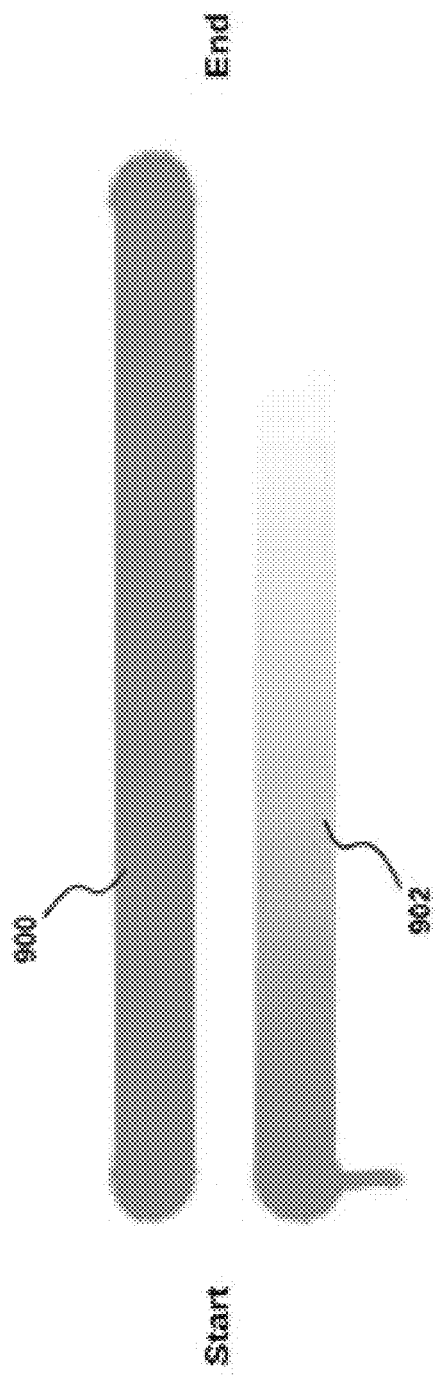
FIGS. 9A-9C illustrate a method for toggling the output spray of a spray can.
Figure 9B:
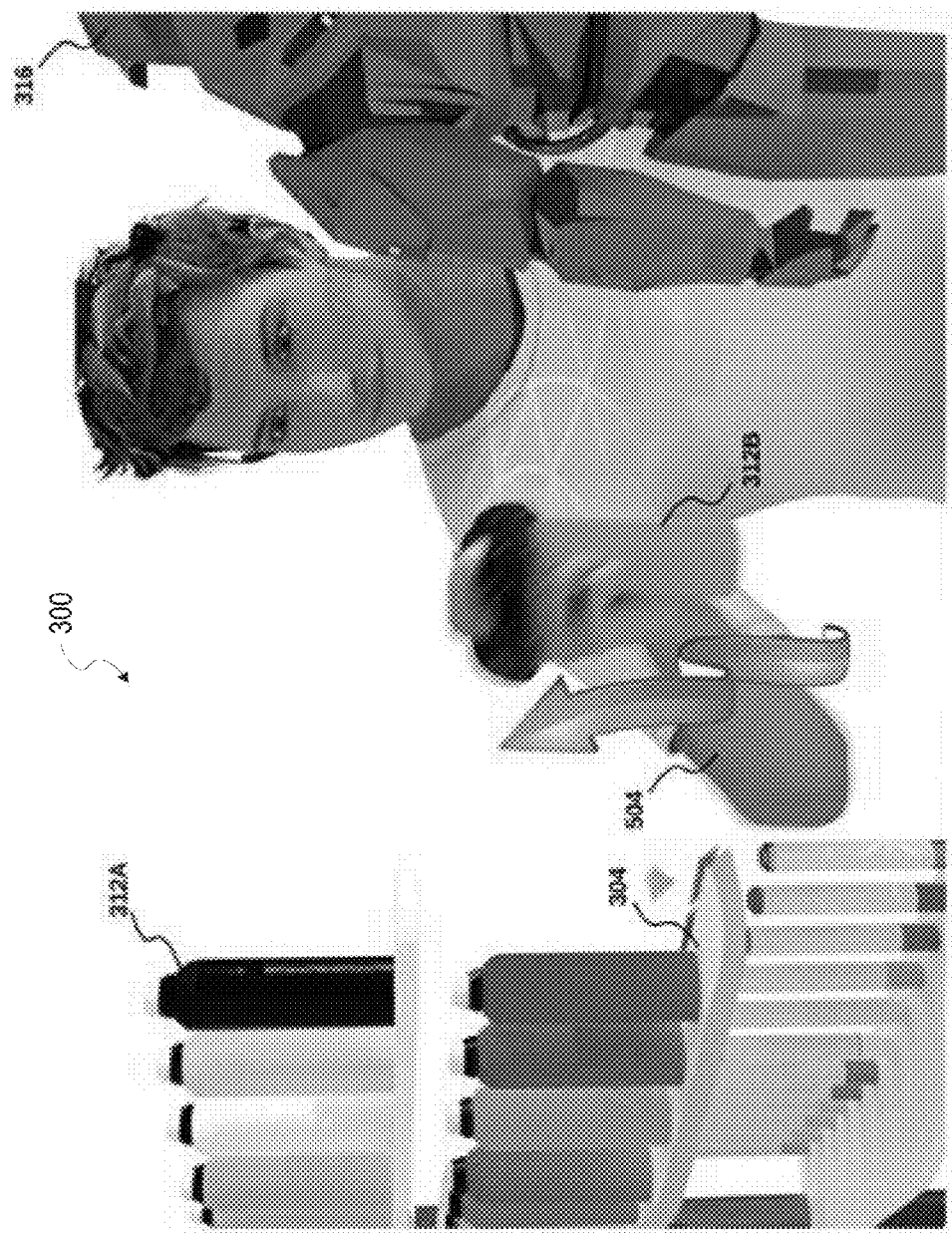
Figure 9C:
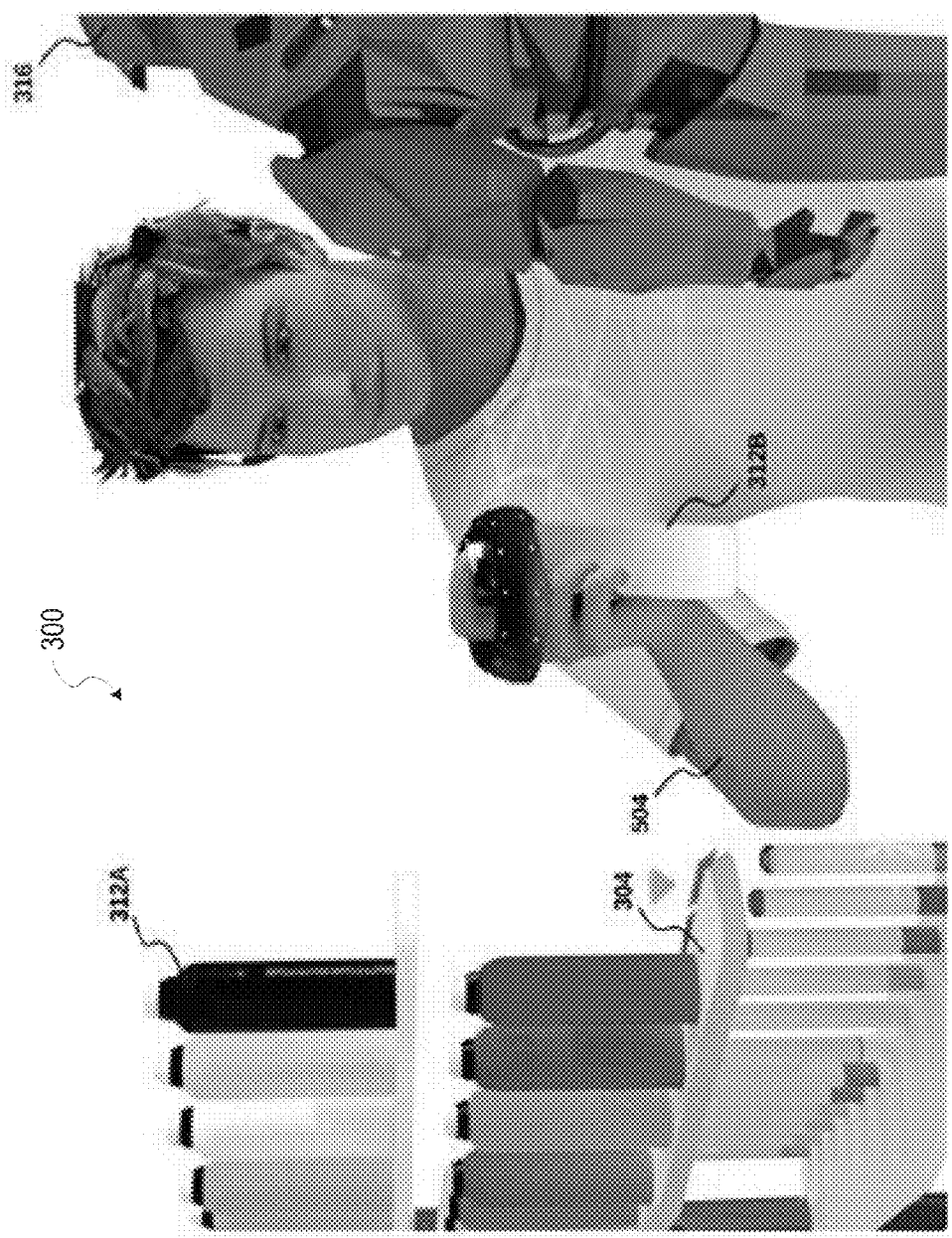

FIGS. 9A-9C illustrate a method for toggling the output spray of a spray can 312B. FIG. 9A illustrates two example output sprays from the spray can 312B after the user 100 has sprayed from left to right with constant pressure on a trigger of the spray can 312B. The first output is a solid spray 900 wherein the output color of the spray remains constant for as long as the user 100 holds the trigger. A second output is a variable-opaqueness spray 902 wherein the opaqueness of the output color changes over time as the user 100 holds the trigger. In the example shown, the color fades over time as the user 100 holds the trigger and moves the spray can 312B. FIG. 9B illustrates the user 100 holding and shaking the spray can 312B with their virtual right hand 504. The spray can 312B was taken from the painting tray 304. As illustrated in FIG. 9B, the color of the spray can 312B is solid and represents the state of the spray can 312B wherein it produces the solid spray 900 as shown in FIG. 9A. In the example embodiment, the act of shaking the spray can 312B toggles the output mode of the spray can 312B from the solid spray 900 to the variable-opaqueness spray 902, or vice versa. FIG. 9C illustrates the spray can 312B after shaking, wherein the opaqueness of the can 312B has changed to match the opaqueness of the variable opaqueness spray 902. The top of the spray can 312B is solid green, while the bottom of the spray can 312B is white, or transparent, thereby visually indicating the current mode of the spray can 312B.

Figure 10B:
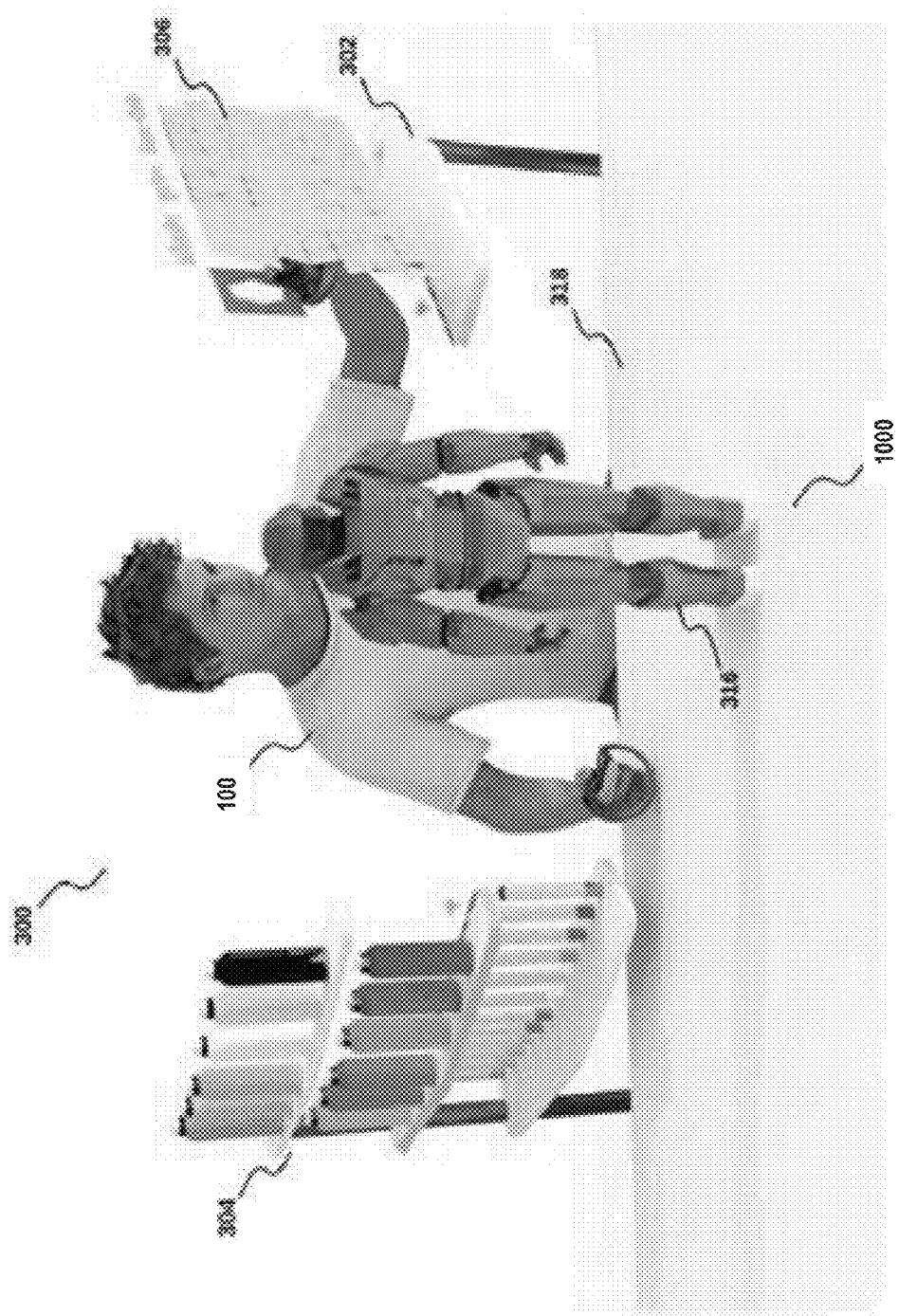

FIGS. 10A and 10B illustrate a method for resetting the orientation of the target object 316 with the texturing station shown in FIG. 3. FIG. 10A shows the user 100, within the texturing station, texturing the target object 316 with a marker 314C (e.g., taken from the painting tray 304). In some embodiments, while the target object 316 is in the texturing station, the gravity (e.g., from animation physics) for the target object 316 may be disabled (e.g., such that the target object 316 remains suspended in the air in any orientation). The user 100 may change the orientation of the target object 316 by grabbing, moving, or reorienting the target object 316 using their virtual hands. The target object 316 remains in the position and orientation last set by the user 100 prior to releasing the target object 316 with their hands. This allows the user 100 to freeze the target object 316 in mid-air to facilitate the texturing of the target object 316 on various surfaces of the target object 316.

Further, in FIG. 10A, an area 1000 is highlighted on the table surface 318. The user 100 may reset the orientation and position of the target object 316 to a default orientation by placing the target object 316 on the area 1000 and releasing it. The target object 316, when placed on the area 1000, reorients itself to the default orientation. The target object 316 may also center itself on the area 1000. The default orientation may be chosen by the user to be any orientation of the target object 316. In some embodiments, the target object 316 may have a pre-defined default orientation set within the metadata of the target object 316. FIG. 10B illustrates the target object 316 after it has been reoriented on the table surface 318. In this example, the default orientation is for the target object 316 to be standing straight up, centered and facing the user.

Figure 11:
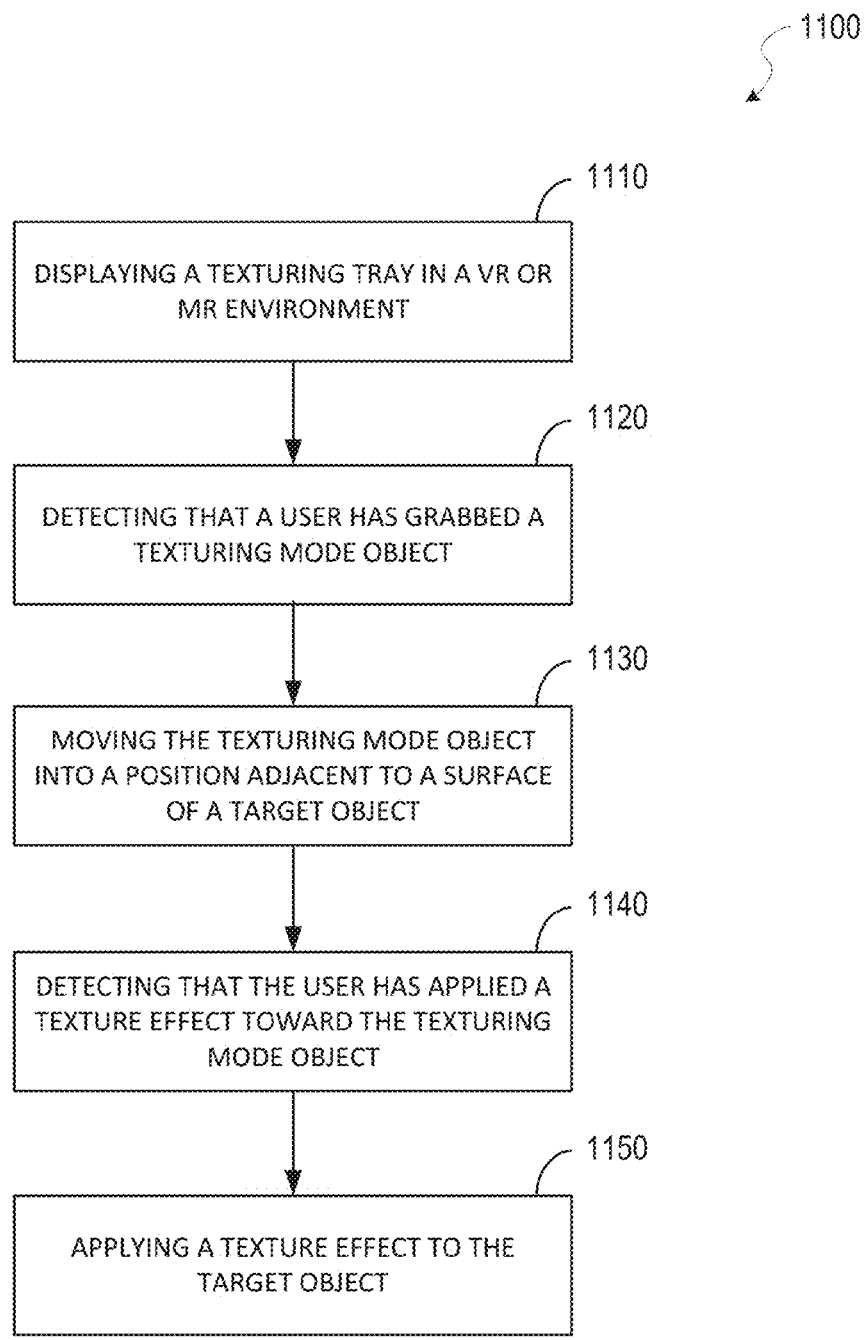
FIG. 11 is a flow chart of a computer-implemented method for providing texturing tools in a VR or MR environment.

FIG. 11 is a flow chart of a computer-implemented method 1100 for providing texturing tools in a VR or MR environment. In the example embodiment, the method 1100 is performed by a computing device comprising at least one processor. The method 1100 includes displaying a texturing tray within an environment, the environment being one of a virtual reality environment and a mixed reality environment, the texturing tray being a virtual object within the environment, the texturing tray including a first plurality of texturing mode objects, each texturing mode object of the first plurality of texturing mode objects being a virtual object within the environment (see operation 1110). The method

1100 also includes detecting that a user has grabbed a first texturing mode object of the first plurality of texturing mode objects from the texturing tray with a virtual hand of the user (see operation 1120).

In the example embodiment, the method 1100 also includes moving the first texturing mode object into a position adjacent to a surface of a target object based on motion of the virtual hand after the grabbing (see operation 1130). In some embodiments, moving the first texturing mode object into a position adjacent to a surface of a target object further includes detecting that the first texturing mode object is within a predetermined distance of the surface of the target object, and removably attaching the first texturing mode object to the surface of the target object.

In the example embodiment, the method 1100 also includes detecting that the user has applied a texturing agent in relation to the first texturing mode object (see operation 1140). The method 1100 also includes applying a texture effect to the surface of the target object based on a virtual interaction between the texturing agent and the first texturing mode object, the texture effect altering the appearance of the surface of the target object (see operation 1150).

In some embodiments, the first texturing mode object includes a stencil shape, the texturing agent is a color spray, and applying the texture effect includes applying color to the surface of the target object through the stencil shape. In some embodiments, the first texturing mode object includes a mask shape, the texturing agent is a color spray, and applying the texture effect includes applying color to the surface of the target object around the mask shape. In some embodiments, the texturing tray includes a display wall, and the first plurality of texturing mode objects are attached to the display wall.

In some embodiment, the texturing tray includes a plurality of texture mode selectors, each mode selector is associated with one of a plurality of sets of texture mode objects, and the first plurality of texturing mode objects is one set of texture mode objects of the plurality of sets of texture mode objects. In some embodiments, method further includes detecting selection of a first texture mode selector of the plurality of texture mode selectors, presenting the first plurality of texturing mode objects on the texturing tray, detecting selection of a second texture mode selector of the plurality of texture mode selectors, removing the first plurality of texturing mode objects from the texturing tray in response to said detecting selection of the second texture mode selector, and presenting a second plurality of texturing mode objects on the texturing tray.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A Further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 12:
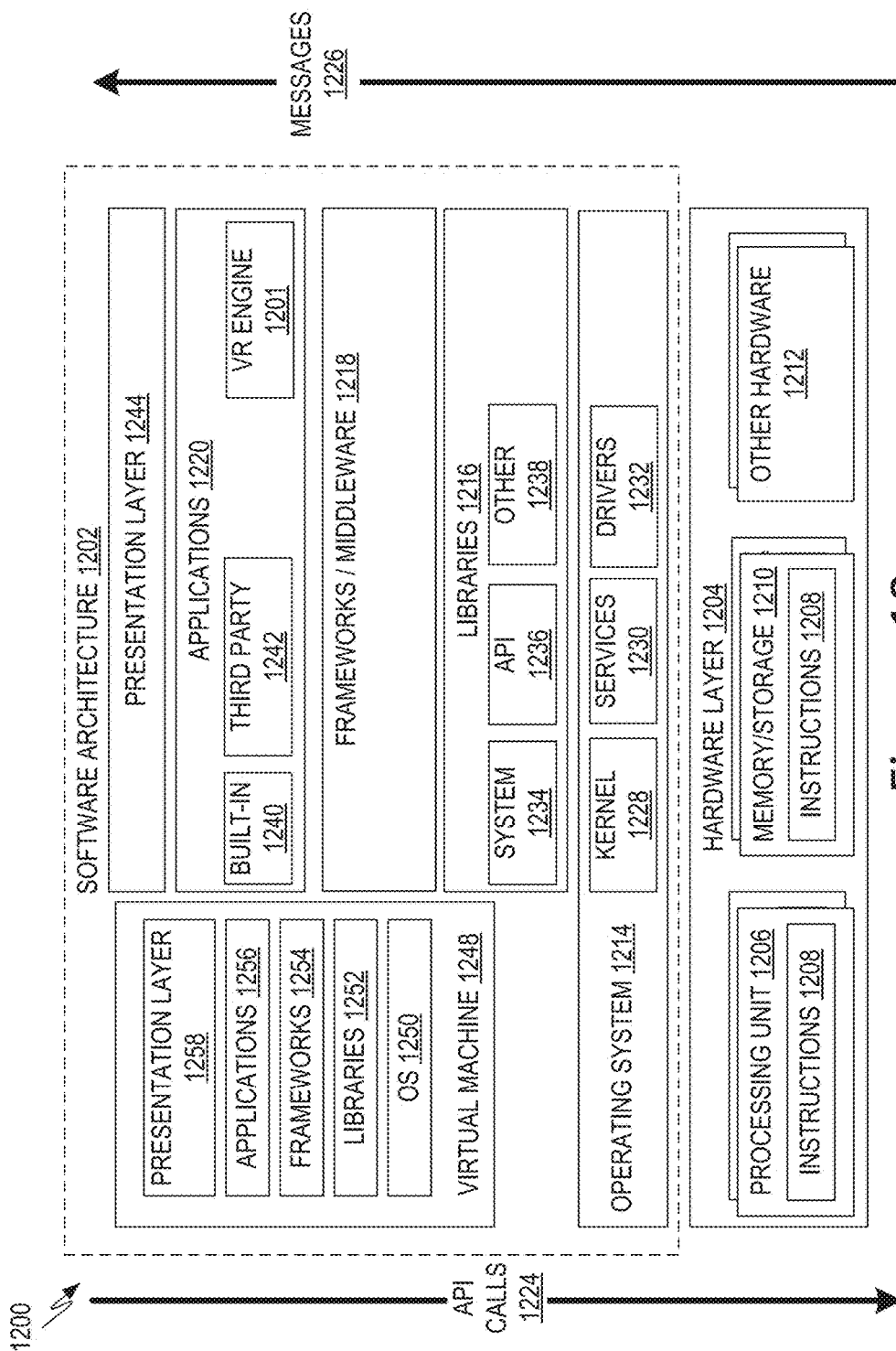
FIG. 12 is a block diagram illustrating an example software architecture, which may be used in conjunction with various hardware architectures herein described to provide a VR engine, which may be similar to the VR engine as described above.
Figure 13:
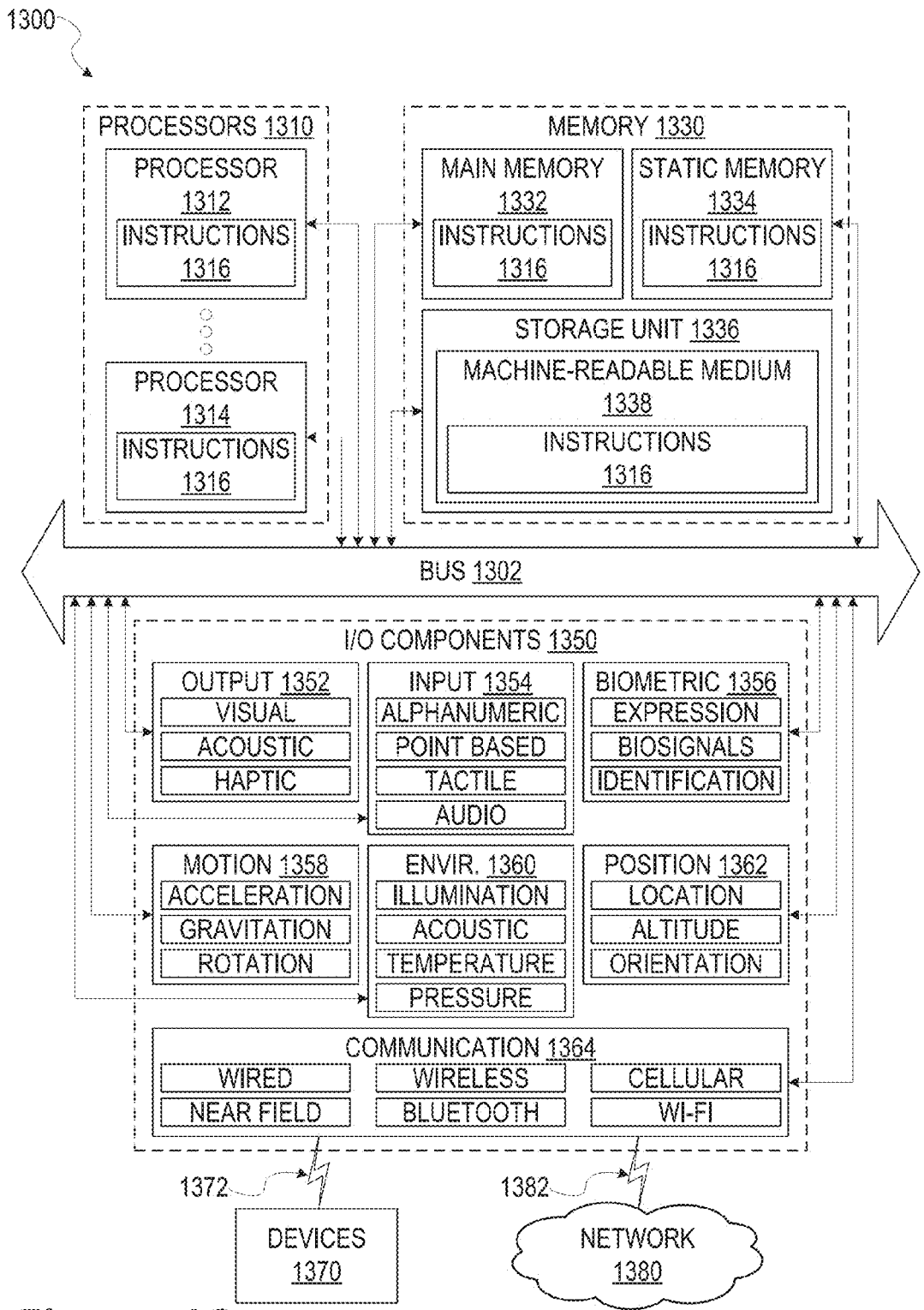
FIG. 13 is a block diagram illustrating components of a machine, according to some example embodiments, configured to read instructions from a machine-readable medium (e.g., a machine-readable storage medium) and perform any one or more of the methodologies discussed herein.

FIG. 13 is a block diagram 1300 illustrating an example software architecture 1202, which may be used in conjunction with various hardware architectures herein described to provide a VR engine 1101, which may be similar to the VR engine 212 as described above. FIG. 12 is a non-limiting example of a software architecture and it will be appreciated that many other architectures may be implemented to facilitate the functionality described herein. The software architecture 1202 may execute on hardware such as a machine 1300 of FIG. 13 that includes, among other things, processors 1310, memory 1330, and input/output (I/O) components 1350. A representative hardware layer 1204 is illustrated and can represent, for example, the machine 1300 of FIG. 13. The representative hardware layer 1204 includes a processing unit 1206 having associated executable instructions 1208. The executable instructions 1208 represent the executable instructions of the software architecture 1202, including implementation of the methods, modules and so forth described herein. The hardware layer 1204 also includes memory/storage 1210, which also includes the executable instructions 1208. The hardware layer 1204 may also comprise other hardware 1212.

In the example architecture of FIG. 12, the software architecture 1202 may be conceptualized as a stack of layers where each layer provides particular functionality. For example, the software architecture 1202 may include layers such as an operating system 1214, libraries 1216, frameworks or middleware 1218, applications 1220 and a presentation layer 1244. Operationally, the applications 1220 and/or other components within the layers may invoke application programming interface (API) calls 1224 through the software stack and receive a response as messages 1226. The layers illustrated are representative in nature and not all software architectures have all layers. For example, some mobile or special purpose operating systems may not provide the frameworks/middleware 1218, while others may provide such a layer. Other software architectures may include additional or different layers.

The operating system 1214 may manage hardware resources and provide common services. The operating system 1214 may include, for example, a kernel 1228, services 1230, and drivers 1232. The kernel 1228 may act as an abstraction layer between the hardware and the other software layers. For example, the kernel 1228 may be responsible for memory management, processor management (e.g., scheduling), component management, networking, security settings, and so on. The services 1230 may provide other common services for the other software layers.

The drivers 1232 may be responsible for controlling or interfacing with the underlying hardware. For instance, the drivers 1232 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1216 may provide a common infrastructure that may be used by the applications 1220 and/or other components and/or layers. The libraries 1216 typically provide functionality that allows other software modules to perform tasks in an easier fashion than by interfacing directly with the underlying operating system 1214 functionality (e.g., kernel 1228, services 1230 and/or drivers 1232). The libraries 1216 may include system libraries 1234 (e.g., C standard library) that may provide functions such as memory allocation functions, string manipulation functions, mathematic functions, and the like. In addition, the libraries 1216 may include API libraries 1236 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1216 may also include a wide variety of other libraries 1238 to provide many other APIs to the applications 1220 and other software components/modules.

The frameworks 1218 (also sometimes referred to as middleware) provide a higher-level common infrastructure that may be used by the applications 1220 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1220 and/or other software components/modules, some of which may be specific to a particular operating system or platform.

The applications 1220 include built-in applications 1240 and/or third-party applications 1242. Examples of representative built-in applications 1240 may include, but are not limited to, a contacts application, a browser application, a book reader application, a location application, a media application, a messaging application, and/or a game application. Third-party applications 1242 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 1242 may invoke the API calls 1224 provided by the mobile operating system such as operating system 1214 to facilitate functionality described herein.

The applications 1220 may use built-in operating system functions (e.g., kernel 1228, services 1230 and/or drivers 1232), libraries 1216, or frameworks/middleware 1218 to create user interfaces to interact with users of the system. Alternatively, or additionally, in some systems, interactions with a user may occur through a presentation layer, such as the presentation layer 1244. In these systems, the application/module "logic" can be separated from the aspects of the application/module that interact with a user.

Some software architectures use virtual machines. In the example of FIG. 12, this is illustrated by a virtual machine 1248. The virtual machine 1248 creates a software environment where applications/modules can execute as if they were executing on a hardware machine (such as the machine 1300 of FIG. 13, for example). The virtual machine 1248 is hosted by a host operating system (e.g., operating system 1214) and typically, although not always, has a virtual machine monitor 1246, which manages the operation of the virtual machine 1248 as well as the interface with the host operating system (i.e., operating system 1214). A software architecture executes within the virtual machine 1248 such as an operating system (OS) 1250, libraries 1252, frameworks 1254, applications 1256, and/or a presentation layer 1258. These layers of software architecture executing within the virtual machine 1248 can be the same as corresponding layers previously described or may be different.

FIG. 13 is a block diagram illustrating components of a machine 1300, according to some example embodiments, configured to read instructions from a machine-readable medium (e.g., a machine-readable storage medium) and perform any one or more of the methodologies discussed herein. In some embodiments, the machine 110 is similar to the HMD 102 or the VR interaction device 202 shown in FIGS. 1-10. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. As such, the instructions 1316 may be used to implement modules or components described herein. The instructions transform the general, non-programmed machine into a particular machine programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines that individually or jointly execute the instructions 1316 to perform any one or more of the methodologies discussed herein.

The machine 1300 may include processors 1310, memory 1330, and input/output (I/O) components 1350, which may be configured to communicate with each other such as via a bus 1302. In an example embodiment, the processors 1310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1312 and a processor 1314 that may execute the instructions 1316. The term "processor" is intended to include multi-core processor that may comprise two or more independent processors (sometimes referred to as "cores") that may execute instructions contemporaneously. Although FIG. 13 shows multiple processors, the machine 1300 may include a single processor with a single core, a single processor with multiple cores (e.g., a multi-core processor), multiple processors with a single core, multiple processors with multiples cores, or any combination thereof.

The memory/storage 1330 may include a memory, such as a main memory 1332, a static memory 1334, or other memory, and a storage unit 1336, both accessible to the processors 1310 such as via the bus 1302. The storage unit 1336 and memory 1332, 1334 store the instructions 1316 embodying any one or more of the methodologies or functions described herein. The instructions 1316 may also reside, completely or partially, within the memory 1332, 1334, within the storage unit 1336, within at least one of the processors 1310 (e.g., within the processor's cache memory), or any suitable combination thereof, during execution thereof by the machine 1300. Accordingly, the memory 1332, 1334, the storage unit 1336, and the memory of processors 1310 are examples of machine-readable media 1338.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1350 may include a wide variety of components to receive input, provide output, produce output, transmit information, exchange information, capture measurements, and so on. The specific input/output (I/O) components 1350 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 1350 may include many other components that are not shown in FIG. 13. The input/output (I/O) components 1350 are grouped according to functionality merely for simplifying the following discussion and the grouping is in no way limiting. In various example embodiments, the input/output (I/O) components 1350 may include output components 1352 and input components 1354. The output components 1352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 1350 may include biometric components 1356, motion components 1358, environmental components 1360, or position components 1362, among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 may include acceleration sensor components (e.g., accelerometer), gravitation sensor components, rotation sensor components (e.g., gyroscope), and so forth. The environmental components 1360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1362 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 1350 may include communication components 1364 operable to couple the machine 1300 to a network 1380 or devices 1370 via a coupling 1382 and a coupling 1372 respectively. For example, the communication components 1364 may include a network interface component or other suitable device to interface with the network 1380. In further examples, the communication components 1364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a Universal Serial Bus (USB)).

Moreover, the communication components 1364 may detect identifiers or include components operable to detect identifiers. For example, the communication components 1364 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1362, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

The invention claimed is:

1. A system comprising:
one or more hardware processors; and a texturing module, executable by the one or more hardware processors, configured to perform operations for applying a texture effect to a target object that is to be included in a setting of a computer game for subsequent rendering of the target object to a player of the computer game, the operations comprising:

displaying a texturing tray within an environment, the environment being one of a virtual reality environment and a mixed reality environment;

displaying a texturing menu in association with the texturing tray, the texturing menu including a plurality of texture mode selectors, the plurality of texture mode selectors corresponding to a plurality of editing modes;

based on a detecting that a user has selected the first texture mode selector from the texturing menu with a virtual hand of the user, presenting a first plurality of texture mode objects in the texturing tray and selecting a first editing mode of the plurality of editing modes, the first editing mode being a transferring mode;

based on a detecting that the user grabbed a texturing mode object of the first plurality of texturing mode objects from the texturing tray with the virtual hand of the user, performing operations for implementing the transferring mode, the operations for implementing the transferring mode comprising:

based on motion of the virtual hand after the grabbing, moving the texturing mode object of the first plurality of texturing mode objects into a position adjacent to a surface of a target object;

detecting that the user has applied a texturing agent in relation to the texturing mode object of the first plurality of texturing mode objects;

applying the texture effect to the surface of the target object based on a virtual interaction between the texturing agent and the texturing mode object of the first plurality of texture mode objects, the texture effect altering the surface of the target object by transferring a texture pattern corresponding to the texturing mode object of the first plurality of texturing mode objects onto the target object; and including the target object in the setting of a computer game for the subsequent rendering of the target object to the player of the computer game.

2. The system of claim 1, wherein the texturing mode object of the first plurality of texturing objects includes a frame having a particular shape and the texture pattern fills the frame.

3. The system of claim 1, wherein the texturing tray includes a display wall, wherein the plurality of texturing mode objects of the first plurality of texturing mode objects are attached to the display wall.

4. The system of claim 1, the operations further comprising:

based on a detecting that a user has selected a second texture mode selector of the plurality of texture mode selectors from the texturing menu with the virtual hand of the user, removing the first plurality of texturing mode objects from the texturing tray, presenting a second plurality of texturing mode objects on the texturing tray, and selecting a second editing mode of the plurality of editing modes, the second editing mode being one of a stencil mode, a mask mode, and a stamp mode.

5. The system of claim 4, wherein the second editing mode is the mask mode and the operations further comprise:

based on a detecting that the user grabbed a texturing mode object of the second plurality of texturing mode objects from the texturing tray with the virtual hand of the user, performing operations for implementing the mask mode, the operations for implementing the mask mode comprising:

based on motion of the virtual hand after the grabbing, moving the texturing mode object of the second plurality of texturing mode objects into a position adjacent to a surface of a target object, the moving including simulating a magnetic attachment of the texturing mode object of the second plurality of texturing mode objects to the target object;

detecting that the user has applied a texturing agent in relation to the texturing mode object of the second plurality of texturing mode objects; and applying the texture effect to the surface of the target object based on a virtual interaction between the texturing agent and the texturing mode object of the second plurality of texture mode objects, the texture effect altering the surface of the target object by applying a color to a portion of the surface of the target object that is not covered by a mask shape corresponding to the texturing object of the second plurality of texture mode objects.

6. The system of claim 5, wherein the simulating of the magnetic attachment-includes:

detecting that the texturing mode object of the second plurality of texture mode objects is within a predetermined distance of the surface of the target object; and removably attaching the texturing mode object of the second plurality of texture mode objects to the surface of the target object.

7. The system of claim 4, wherein the second editing mode is the stencil mode and the operations further comprise:

based on a detecting that the user grabbed a texturing mode object of the second plurality of texturing mode objects from the texturing tray with the virtual hand of the user, performing operations for implementing the mask mode, the operations for implementing the mask mode comprising:

based on motion of the virtual hand after the grabbing, moving the texturing mode object of the second plurality of texturing mode objects into a position adjacent to a surface of a target object, the moving including simulating a magnetic attachment of the texturing mode object of the second plurality of texturing mode objects to the target object;

detecting that the user has applied a texturing agent in relation to the texturing mode object of the second plurality of texturing mode objects; and applying the texture effect to the surface of the target object based on a virtual interaction between the texturing agent and the texturing mode object of the second plurality of texture mode objects, the texture effect altering the surface of the target object by applying a color to portions of the surface of the target object that are not covered by a pattern of a stencil corresponding to the texturing object of the second plurality of texture mode objects.

8. The system of claim 4, wherein the second editing mode is the stamp mode and the operations further comprise:

based on a detecting that the user grabbed a texturing mode object of the second plurality of texturing mode objects from the texturing tray with the virtual hand of the user, performing operations for implementing the mask mode, the operations for implementing the mask mode comprising:
  based on motion of the virtual hand after the grabbing, moving the texturing mode object of the second plurality of texturing mode objects into a position adjacent to a surface of a target object;
  detecting that the user has applied a texturing agent in relation to the texturing mode object of the second plurality of texturing mode objects; and
  applying the texture effect to the surface of the target object based on a virtual interaction between the texturing agent and the texturing mode object of the second plurality of texture mode objects, the texture effect altering the surface of the target object by applying a stamp pattern to the surface of the target object, the stamp pattern corresponding to the texturing object of the second plurality of texturing mode objects.

9. A computer-implemented method comprising:
performing operations for applying a texture effect to a target object that is to be included in a setting of a computer game for subsequent rendering of the target object to a player of the computer game, the operations comprising:
displaying a texturing tray within an environment, the environment being one of a virtual reality environment and a mixed reality environment;
displaying a texturing menu in association with the texturing tray, the texturing menu including a plurality of texture mode selectors, the plurality of texture mode selectors corresponding to a plurality of editing modes;
based on a detecting that a user has selected the first texture mode selector from the texturing menu with a virtual hand of the user, presenting a first plurality of texture mode objects in the texturing tray and selecting a first editing mode of the plurality of editing modes, the first editing mode being a transferring mode;
based on a detecting that the user grabbed a texturing mode object of the first plurality of texturing mode objects from the texturing tray with the virtual hand of the user, performing operations for implementing the transferring mode, the operations for implementing the transferring mode comprising:
  based on motion of the virtual hand after the grabbing, moving the texturing mode object of the first plurality of texturing mode objects into a position adjacent to a surface of a target object;
  detecting that the user has applied a texturing agent in relation to texturing mode object of the first plurality of texturing mode objects;
  applying the texture effect to the surface of the target object based on a virtual interaction between the texturing agent and the texturing mode object of the first plurality of texture mode objects, the texture effect altering the surface of the target object by transferring a texture pattern corresponding to the texturing mode object of the first plurality of texturing mode objects onto the target object; and
  including the target object in the setting of a computer game for the subsequent rendering of the target object to the player of the computer game.

10. The method of claim 9 wherein the texturing mode object of the first plurality of texturing objects includes a frame having a particular shape and the texture pattern fills the frame.

11. The method of claim 9, wherein the texturing tray includes a display wall, wherein the plurality of texturing mode objects of the first plurality of texturing mode objects are attached to the display wall.

12. The method of claim 9, the operations further comprising:
based on a detecting that a user has selected a second texture mode selector of the plurality of texture mode selectors from the texturing menu with the virtual hand of the user,
removing the first plurality of texturing mode objects from the texturing tray, presenting a second plurality of texturing mode objects on the texturing tray, and selecting a second editing mode of the plurality of editing modes, the second editing mode being one of a stencil mode, a mask mode, and a stamp mode.

13. A non-transitory machine-readable medium storing processor-executable instructions which, when executed by a processor, cause the processor to perform operations for applying a texture effect to a target object that is to be included in a setting of a computer game for subsequent rendering of the target object to a player of the computer game, the operations comprising:
displaying a texturing tray within an environment, the environment being one of a virtual reality environment and a mixed reality environment;
displaying a texturing menu in association with the texturing tray, the texturing menu including a plurality of texture mode selectors, the plurality of texture mode selectors corresponding to a plurality of editing modes;
based on a detecting that a user has selected the first texture mode selector from the texturing menu with a virtual hand of the user, presenting a first plurality of texture mode objects in the texturing tray and selecting a first editing mode of the plurality of editing modes, the first editing mode being a transferring mode;
based on a detecting that the user grabbed a texturing mode object of the first plurality of texturing mode objects from the texturing tray with the virtual hand of the user, performing operations for implementing the transferring mode, the operations for implementing the transferring mode comprising:
  based on motion of the virtual hand after the grabbing, moving the texturing mode object of the first plurality of texturing mode objects into a position adjacent to a surface of a target object;
  detecting that the user has applied a texturing agent in relation to the texturing mode object of the first plurality of texturing mode objects;
  applying the texture effect to the surface of the target object based on a virtual interaction between the texturing agent and the texturing mode object of the first plurality of texture mode objects, the texture effect altering the surface of the target object by transferring a texture pattern corresponding to the texturing mode object of the first plurality of texturing mode objects onto the target object; and
  including the target object in the setting of a computer game for the subsequent rendering of the target object to the player of the computer game.

14. The machine-readable medium of claim 13, wherein the texturing mode object of the first plurality of texturing objects includes a frame having a particular shape and the texture pattern fills the frame.

15. The machine-readable medium of claim 13, wherein the texturing tray includes a display wall, wherein the plurality of texturing mode objects of the first plurality of texturing mode objects are attached to the display wall.

16. The machine-readable medium of claim 13, the operations further comprising:
- based on a detecting that a user has selected a second texture mode selector of the plurality of texture mode selectors from the texturing menu with the virtual hand of the user,
- removing the first plurality of texturing mode objects from the texturing tray, presenting a second plurality of texturing mode objects on the texturing tray, and selecting a second editing mode of the plurality of editing modes, the second editing mode being one of a stencil mode, a mask mode, and a stamp mode.

* * * * *

UNITED STATES PATENT AND TRADEMARK OFFICE
CERTIFICATE OF CORRECTION

| | | |
|---|---|---|
| PATENT NO. | : 10,001,901 B2 | Page 1 of 1 |
| APPLICATION NO. | : 15/623114 | |
| DATED | : June 19, 2018 | |
| INVENTOR(S) | : Gregory Lionel Xavier Jean Palmaro | |

It is certified that error appears in the above-identified patent and that said Letters Patent is hereby corrected as shown below:

On the Title Page

In item (*), in "Notice", in Column 1, Line 3, delete "days. days." and insert --days.-- therefor In the Claims In Column 21, Line 64, in Claim 10, after "claim 9", insert --,--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*